United States Patent
Deshmukh et al.

(10) Patent No.: US 12,416,259 B1
(45) Date of Patent: Sep. 16, 2025

(54) TURBINE ENGINE INCLUDING A WATER SYSTEM

(71) Applicant: General Electric Company, Schenectady, NY (US)

(72) Inventors: Vaibhav M. Deshmukh, Bengaluru (IN); Vaishnav Raghuvaran, Bengaluru (IN); Sushilkumar Shevakari, Bengaluru (IN); Bhaskar Nanda Mondal, Bengaluru (IN); Rakshit Tirumala, Bengaluru (IN); Jeffrey D. Clements, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/608,177

(22) Filed: Mar. 18, 2024

(51) Int. Cl.
| | | |
|---|---|---|
| F02C 3/30 | (2006.01) | |
| F01D 3/00 | (2006.01) | |
| F01D 3/04 | (2006.01) | |
| F01D 5/08 | (2006.01) | |
| F02C 6/18 | (2006.01) | |
| F02C 7/20 | (2006.01) | |

(52) U.S. Cl.
CPC .......... F02C 3/30 (2013.01); F01D 3/00 (2013.01); F01D 3/04 (2013.01); F01D 5/081 (2013.01); F02C 6/18 (2013.01); F02C 7/20 (2013.01)

(58) Field of Classification Search
CPC ... F01D 3/00; F01D 3/04; F01D 5/081; F01D 5/085; F01D 5/088; F02C 7/20
See application file for complete search history.

(56) References Cited

U.S. PATENT DOCUMENTS

| | | | |
|---|---|---|---|
| 4,081,956 A | 4/1978 | Baker et al. | |
| 4,864,810 A * | 9/1989 | Hines | F01D 3/04 |
| | | | 415/105 |
| 4,928,478 A | 5/1990 | Maslak | |
| 5,376,827 A * | 12/1994 | Hines | H02K 7/1823 |
| | | | 310/67 R |
| 6,564,556 B2 | 5/2003 | Ginter | |

(Continued)

FOREIGN PATENT DOCUMENTS

| | | |
|---|---|---|
| FR | 3127269 A1 | 3/2023 |
| FR | 3130896 A1 | 6/2023 |

(Continued)

*Primary Examiner* — Scott J Walthour
(74) *Attorney, Agent, or Firm* — Venable LLP; Griffin A. A. Deadwick; Michele V. Frank

(57) ABSTRACT

A turbine engine includes a spool with a compressor for providing a compressed air flow to a turbine, a shaft that connects the compressor and a turbine such that the compressor and the turbine rotate together, and a fuel supply. A combustor located downstream of the compressor receives and combusts the compressed air flow and the fuel supply, generating combustion gases. The combustion gases rotate the turbine, in turn rotating the spool. A balance piston for applying an axial force on the spool includes a rotating boundary portion and a fixed enclosure portion that does not rotate, defining a balance piston cavity. A water system provides water to the balance piston cavity, heat transfer from the balance piston to the water causes expansion of the water, the water in the balance piston cavity being balance piston fluid that is pressurized and applies an axial force to the spool.

20 Claims, 9 Drawing Sheets

(56) References Cited

U.S. PATENT DOCUMENTS

| | | |
|---|---|---|
| 8,813,473 B2 | 8/2014 | Fletcher et al. |
| 8,826,671 B2 | 9/2014 | Kim et al. |
| 10,041,417 B2 | 8/2018 | Horikawa et al. |
| 10,054,045 B2 | 8/2018 | Dyrla et al. |
| 10,087,838 B2 | 10/2018 | Moine et al. |
| 2013/0195627 A1* | 8/2013 | Glahn .................. F01D 11/025 415/126 |

FOREIGN PATENT DOCUMENTS

| | | |
|---|---|---|
| FR | 3130897 A1 | 6/2023 |
| FR | 3133367 A1 | 9/2023 |
| FR | 3133368 A1 | 9/2023 |

* cited by examiner

TURBINE ENGINE INCLUDING A WATER SYSTEM

TECHNICAL FIELD

The present disclosure generally relates to a turbine including a water system.

BACKGROUND

A turbine engine generally includes a fan and a core section arranged in flow communication with one another. A combustor is arranged in the core section to generate combustion gases for driving a turbine in the core section of the turbine engine.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
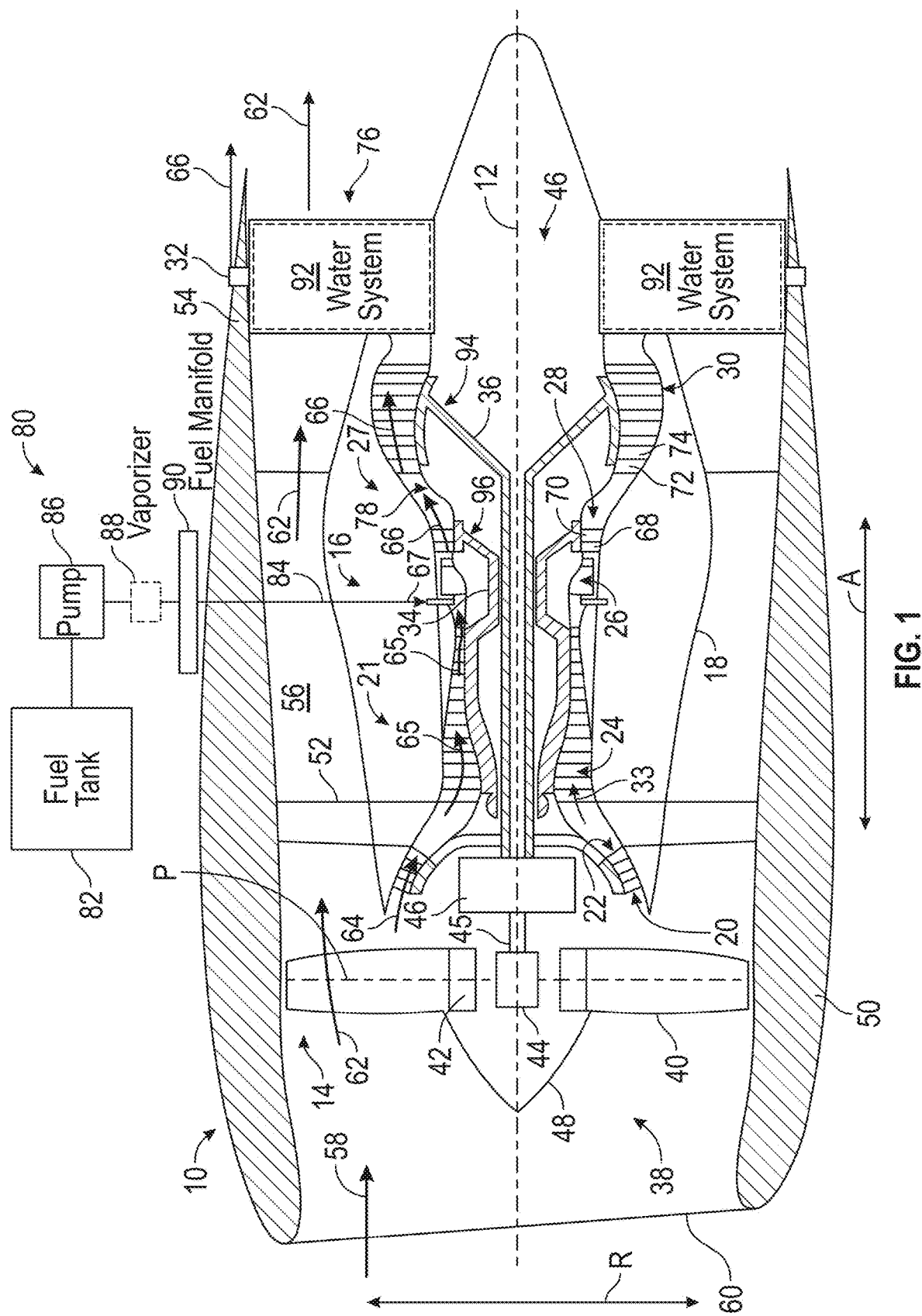
FIG. 1 is a schematic cross-sectional view of a turbine engine with a water system, taken along a longitudinal centerline axis of the turbine engine, according to an embodiment of the disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first" and "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position closer to an engine inlet and aft refers to a position closer to an engine nozzle or exhaust.

The terms "coupled," "fixed," "attached," and the like, refer to both direct coupling, fixing, attaching, or connecting, as well as indirect coupling, fixing, attaching, or connecting through one or more intermediate components or features, unless otherwise specified herein.

As used herein, the terms "low," "mid" (or "mid-level"), and "high," or their respective comparative degrees (e.g., "lower" and "higher", where applicable), when used with compressor, turbine, shaft, fan, or turbine engine components, each refers to relative pressures, relative speeds, relative temperatures, and/or relative power outputs within an engine unless otherwise specified. For example, a "low-power" setting defines the engine configured to operate at a power output lower than a "high-power" setting of the engine, and a "mid-level power" setting defines the engine configured to operate at a power output higher than a "low-power" setting and lower than a "high-power" setting. The terms "low," "mid" (or "mid-level") or "high" in such aforementioned terms may additionally, or alternatively, be understood as relative to minimum allowable speeds, pressures, or temperatures, or minimum or maximum allowable speeds, pressures, or temperatures relative to normal, desired, steady state, etc., operation of the engine.

The various power levels of the turbine engine detailed herein are defined as a percentage of a sea level static (SLS) maximum engine rated thrust. Low-power operation includes, for example, less than thirty percent (30%) of the SLS maximum engine rated thrust of the turbine engine. Mid-level power operation includes, for example, thirty percent (30%) to eighty-five percent (85%) of the SLS maximum engine rated thrust of the turbine engine. High-power operation includes, for example, greater than eighty-five percent (85%) of the SLS maximum engine rated thrust of the turbine engine. The values of the thrust for each of the low-power operation, the mid-level power operation, and the high-power operation of the turbine engine are exemplary only, and other values of the thrust can be used to define the low-power operation, the mid-level power operation, and the high-power operation.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The singular forms "a," "an," and "the" include plural references unless the context clearly dictates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Turbine engines incorporate thrust pistons in order to axially support the spools. Use of thrust pistons reduces the load on mechanical thrust bearings. Thrust pistons use compressed gas, such as air, to support a portion of the overall axial load on the respective spool. Reducing the load on the thrust bearings provides a longer service life for thrust bearings. Turbine engines additionally incorporate balance pistons, which function similar to thrust pistons, allowing for variability in the amount of axial load applied. Water as a piston fluid allows for easier pumping while in a liquid state, and provides heat transfer away from internal components in changing phase from liquid water to steam.

As used herein, the term "interface" can refer alternatively to one or more seals, bearings, or defined gaps between components, where one component is movable (e.g., rotating) relative to the other. A seal may be any one of an oil seal, a piston seal, a carbon seal, a labyrinth seal, or any other configuration of a seal or a material of a seal as may be conceived to facilitate the movement of one component relative to another component while retaining pressure in the respective cavity. A bearing may be any one of a rolling element bearing, such as a single row ball bearing, a double row ball bearing, a roller bearing, a needle bearing, a tapered roller bearing, or any other rolling element bearing as may be conceived to facilitate the movement of one component relative to another component while retaining pressure in the respective cavity. A bearing may also be a hydrodynamic bearing, a friction bearing, or a sliding bearing, or any other similarly non-rolling-element bearing as may be conceived to facilitate the movement of one component relative to another component while retaining pressure in the respective cavity. A defined gap may be of any size and of any shape as may be conceived to facilitate the movement of one component relative to another component while retaining pressure in the respective cavity, and as may be required to result in an acceptable leak rate through the interface, where appropriate. Additionally, the interface may conceivably include any combination of types of seals, types of bearings and sizes and shapes of gaps. Additionally, interface types may be applied in any combination. For example, bearings and seals are commonly applied together and such a combination may also be applied to the interfaces discussed herein.

Referring now to the drawings, FIG. 1 is a schematic cross-sectional view of a turbine engine 10, including a water system 92, taken along a longitudinal centerline axis 12 (provided for reference) of the turbine engine 10, according to an embodiment of the present disclosure. As shown in FIG. 1, the turbine engine 10 has an axial direction A (extending parallel to the longitudinal centerline axis 12) and a radial direction R that is normal to the axial direction A. In general, the turbine engine 10 includes a fan section 14 and a turbo-engine 16 disposed downstream from the fan section 14.

The turbo-engine 16 includes an outer casing 18 that is substantially tubular and defines an annular core inlet 20. As schematically shown in FIG. 1, the outer casing 18 encases, in serial flow relationship, a compressor section 21 including a booster or a low-pressure compressor (LPC) 22 followed downstream by a high-pressure compressor (HPC) 24, a combustor 26, a turbine section 27, including a high-pressure turbine (HPT) 28, followed downstream by a low-pressure turbine (LPT) 30, and one or more core exhaust nozzles 32. A high-pressure (HP) shaft 34 drivingly connects the HPT 28 to the HPC 24 to rotate the HPT 28 and the HPC 24 in unison. The HPT 28 is drivingly coupled to the HP shaft 34 to rotate the HP shaft 34 when the HPT 28 rotates.

A low-pressure (LP) shaft 36 drivingly connects the LPT 30 to the LPC 22 to rotate the LPT 30 and the LPC 22 in unison. The LPT 30 is drivingly coupled to the LP shaft 36 to rotate the LP shaft 36 when the LPT 30 rotates. The compressor section 21, the combustor 26, the turbine section 27, and the one or more core exhaust nozzles 32 together define a core air flow path 33.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. Each fan blade 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. The gearbox assembly 46 is shown schematically in FIG. 1. The gearbox assembly 46 includes a plurality of gears for adjusting the rotational speed of the fan shaft 45 and, thus, the fan 38 relative to the LP shaft 36.

Referring still to the exemplary embodiment of FIG. 1, the disk 42 is covered by a rotatable fan hub 48 aerodynamically contoured to promote an airflow through the plurality of fan blades 40. In addition, the fan section 14 includes an annular fan casing or a nacelle 50 that circumferentially surrounds the fan 38, at least a portion of the turbo-engine 16, or both. The nacelle 50 is supported relative to the turbo-engine 16 by a plurality of circumferentially spaced outlet guide vanes 52. Moreover, a downstream section 54 of the nacelle 50 extends over an outer portion of the turbo-engine 16 to define a bypass airflow passage 56 therebetween. The one or more core exhaust nozzles 32 may extend through the nacelle 50 and be formed therein. In this example, the one or more core exhaust nozzles 32 include one or more discrete nozzles that are spaced circumferentially about the nacelle 50. Other arrangements of the core exhaust nozzles 32 may be used including, for example, a single core exhaust nozzle that is annular, or partially annular, about the nacelle 50.

During operation of the turbine engine 10, a volume of air 58 enters the turbine engine 10 through an inlet 60 of the nacelle 50 or the fan section 14. As the volume of air 58 passes across the fan blades 40, a first portion of air 62, also referred to as bypass air 62, is directed or routed into the bypass airflow passage 56, and a second portion of core air 64, also referred to as core air 64, is directed or is routed into the upstream section of the core air flow path 33, or, more specifically, into the core inlet 20. The ratio between the first portion of air 62 and the second portion of core air 64 is known as a bypass ratio. In some embodiments, the bypass ratio may be greater than 18:1, enabled by the water system 92, as detailed further below. The pressure of the core air 64 is increased by the LPC 22, generating compressed air 65, and the compressed air 65 is routed through the HPC 24 and further compressed before being directed into the combustor 26, where the compressed air 65 is mixed with fuel 67 and burned to generate combustion gases 66, also referred to as combustion gases 66.

The LPC 22, the HPC 24, or both the LPC 22 and the HPC 24 may include one or more stages, with each subsequent stage further compressing the compressed air 65. The HPC 24 may have a compression ratio greater than 20:1, preferably, in a range of 20:1 to 40:1. The compression ratio is a ratio of a pressure of a last stage of the HPC 24 to a pressure of a first stage of the HPC 24. The compression ratio greater than 20:1 is enabled by the water system 92, as detailed further below.

The combustion gases 66 are routed into the HPT 28 and expanded through the HPT 28 where a portion of thermal energy or kinetic energy from the combustion gases 66 is extracted via sequential stages of HPT stator vanes 68 that are coupled to the outer casing 18 and to a plurality of HPT rotor blades 70 that are coupled to the HP shaft 34, thus, causing the HP shaft 34 to rotate, which supports operation of the HPC 24. The combustion gases 66 are then routed into the LPT 30 and expanded through the LPT 30. Here, a second portion of thermal energy or kinetic energy is extracted from the combustion gases 66 via sequential stages of LPT stator vanes 72 that are coupled to the outer casing 18 and to a plurality of LPT rotor blades 74 that are coupled to the LP shaft 36, thus, causing the LP shaft 36 to rotate, which supports operation of the LPC 22 and rotation of the fan 38 via the gearbox assembly 46. The HPT 28, the LPT 30, or both the HPT 28 and the LPT 30 may have one or more stages. The HPC 24 having a compression ratio in a range of 20:1 to 40:1 results in the HPT 28 having a pressure expansion ratio in a range of 1.5:1 to 4:1 and the LPT 30 having a pressure expansion ratio in a range of 4.5:1 to 28:1.

The combustion gases 66 are subsequently routed through the one or more core exhaust nozzles 32 of the turbo-engine 16 to provide propulsive thrust. Simultaneously with the flow of the core air 64 through the core air flow path 33, the bypass air 62 is routed through the bypass airflow passage 56 before being exhausted from a fan bypass nozzle 76 of the turbine engine 10, also providing propulsive thrust. The combustor 26, the HPT 28, the LPT 30, and the one or more core exhaust nozzles 32 at least partially define a hot gas path 78 for routing the combustion gases 66 through the turbo-engine 16.

As noted above, the compressed air 65 (i.e., the core air 64) is mixed with the fuel 67 in the combustor 26 to generate a fuel 67 and air mixture, and combusted, generating combustion gases 66. The fuel 67 can include any type of fuel 67 used for turbine engines, such as, for example, sustainable aviation fuels (SAF) including biofuels, Jet A, or other hydrocarbon fuels. The fuel 67 also may be a hydrogen-based fuel ($H_2$), and may include blends with hydrocarbon fuels. In some embodiments, the hydrogen fuel may comprise substantially pure hydrogen molecules (i.e., diatomic hydrogen). The fuel 67 may be a cryogenic fuel 67. For example, in examples with hydrogen fuel 67, the hydrogen fuel 67 may be stored in a liquid phase at cryogenic temperatures.

The turbine engine 10 includes a fuel system 80 for providing the fuel 67 to the combustor 26. The fuel system 80 includes a fuel tank 82 for storing the fuel therein, a fuel manifold 90, and a combustor fuel supply 84. The fuel tank 82 can be located on an aircraft (not shown) to which the turbine engine 10 is attached. While a single fuel tank 82 is shown in FIG. 1, the fuel system 80 can include any number of fuel tanks 82. The fuel manifold 90 apportions the flow of fuel from the fuel tank 82 for the combustor 26. The combustor fuel supply 84 provides fuel 67 from the fuel manifold 90 to the combustor 26. The combustor fuel supply 84 includes one or more lines, conduits, pipes, tubes, etc., configured to carry the fuel from the fuel tank 82 to the combustor 26. The combustor fuel supply 84 also includes a pump 86 to induce the flow of the fuel through the combustor fuel supply 84 to the combustor 26. In this way, the pump 86 causes the fuel to flow from the fuel tank 82, through the combustor fuel supply 84, and into the combustor 26. Alternatively, the pump 86 may be integrated into the fuel manifold 90. The fuel system 80 and, more specifically, the fuel tank 82 and the combustor fuel supply 84, either collectively or individually, may be a fuel source for the combustor 26.

In some embodiments, for example, when the fuel is a hydrogen fuel, the fuel system 80 includes one or more vaporizers 88 (illustrated as optionally included by dashed lines) and a fuel manifold 90 in fluid communication with the combustor fuel supply 84. In such an example, the hydrogen fuel is stored in the fuel tank 82 as liquid hydrogen fuel. The one or more vaporizers 88 heat the liquid hydrogen fuel. The one or more vaporizers 88 may be positioned in the flow path of the fuel between the fuel tank 82 and the fuel manifold 90, and may be located downstream of the pump 86. Alternatively, the vaporizers 88 may be incorporated into the structure of the fuel manifold 90. The one or more vaporizers 88 are in thermal communication with at least one heat source, such as, for example, waste heat from the turbine engine 10 and/or from one or more systems of the aircraft (not shown). The one or more vaporizers 88 heat the liquid hydrogen fuel and the liquid hydrogen fuel is converted into a gaseous hydrogen fuel within the one or more vaporizers 88. The combustor fuel supply 84 directs the gaseous hydrogen fuel into the combustor 26.

In some embodiments, for example, the fuel manifold 90 is positioned downstream of the one or more vaporizers 88 and the pump 86. The fuel manifold 90 receives hydrogen fuel in a substantially completely gaseous phase, or in a substantially completely supercritical phase. The fuel manifold 90 provides the flow of fuel to the combustor 26 in a desired manner. More specifically, the fuel manifold 90 provides a desired volume of hydrogen fuel at, for example, a desired flow rate, to one or more fuel injectors that inject the hydrogen fuel into the combustor 26. The fuel system 80 can include additional components for supplying the fuel from the fuel tank 82 to the combustor 26, such as, for example, additional pumps, valves, fuel lines, and the like.

The turbine engine 10 includes the water system 92. The water system 92 provides steam to components of the turbine engine 10 in order to improve or to optimize one or more parameters of engine performance.

The turbine engine 10 depicted in FIG. 1 is by way of example only. In other exemplary embodiments, the turbine engine 10 may have any other suitable configuration. For example, in other exemplary embodiments, the fan 38 may be configured in any other suitable manner (e.g., as a fixed pitch fan) and further may be supported using any other suitable fan frame configuration. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines, propfan engines, and/or turboprop engines.

Multiple spools are referenced herein, including the terms fan 38, low pressure spool, and high pressure spool. The low pressure spool and the high pressure spool may alternatively be referred to as an LP spool 94 and an HP spool 96, respectively. The term LP spool 94 refers generally to the LPC 22, the LP shaft 36, the LPT 30, and their respective constituent parts. Similarly, the HP spool 96 refers to the HPC 24, the HP shaft 34, the HPT 28, and their respective constituent parts. The fan 38 and its constituent parts may optionally be incorporated into the LP spool 94. When a gearbox assembly 46 is present, the term LP spool 94 may not include the fan 38 and its constituent parts, as the rotation of the fan 38 is mechanically coupled to the LP spool 94 only at the gearbox assembly 46. In such cases, the assembly of the fan 38 and its respective constituent parts may be referred to alternatively as a fan spool.

Figure 2:
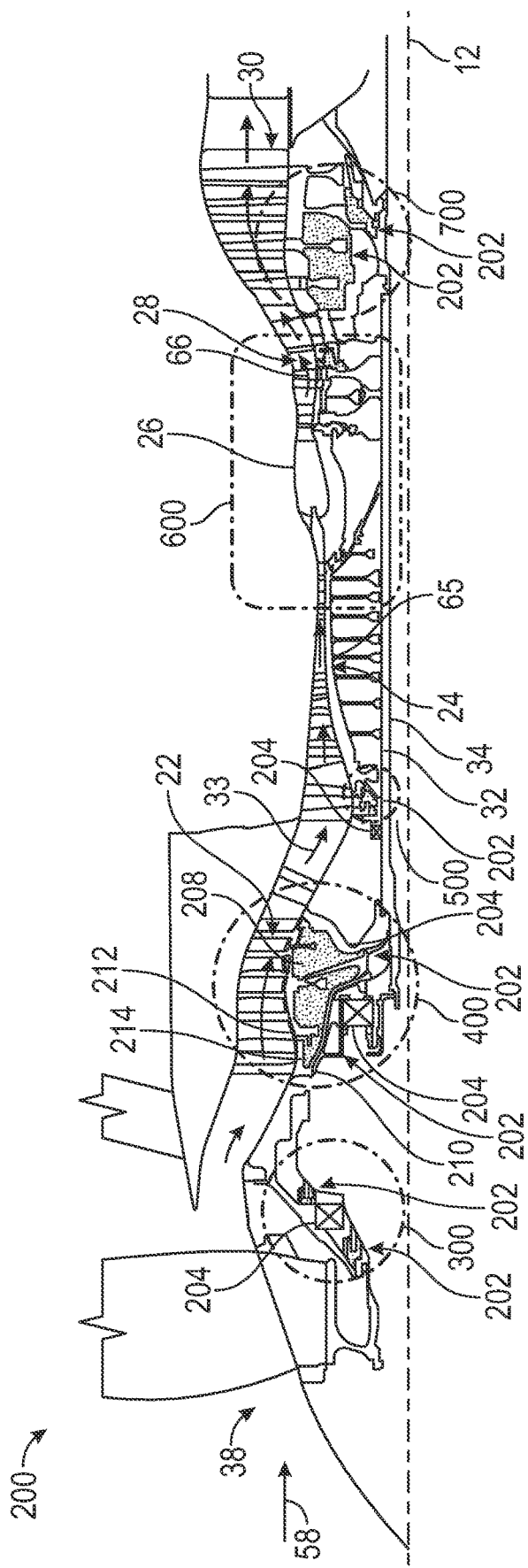
FIG. 2 is a schematic view of a turbine engine with multiple thrust cavities, according to an embodiment of the disclosure.

FIG. 2 illustrates schematic view of a turbine engine 200. The turbine engine 200 is substantially similar to the turbine engine 10 described with respect to FIG. 1, except for the inclusion of multiple thrust pistons that are not shown in FIG. 1, and balance piston cavities that are not shown in FIG. 1. Accordingly, the same reference numerals will be used for components of the turbine engine 200 that are the same as or similar to the components of the turbofan turbine engine 10 as discussed above. The description of these components above also applies to this embodiment, and a detailed description of these components is omitted here. The features and functions of the turbine engine 200 described hereafter, especially as relating to the thrust pistons and balance pistons, are equally applicable to all turbine engines, whether applied to the turbine engine 10 or the turbine engine 200.

During operation of the turbine engine 200, several forces act upon various components of the turbine engine 200, resulting in thrust loads along the longitudinal centerline axis 12. For example, the core air flow 33, which becomes compressed air 65 in the LPC 22 and the HPC 24, subjects each of the LP spool 94 (FIG. 1) and the HP spool 96 (FIG. 1), respectively, to axial loads along the longitudinal centerline axis 12. Following compression in the LPC 22 and in the HPC 24, the combustion in the combustor 26 increases pressure of the compressed air 65 and generates combustion gases 66 under pressure higher than the compressed air 65. The combustion gases 66 flowing first through the HPT 28 and then the LPT 30 apply a thrust load along the longitudinal centerline axis 12, on each of the HP spool 96 and the LP spool 94, respectively. The thrust loads due to the operation of the turbine engine 200 act in the forward direction, in the aft direction, or both in the forward direction and the aft direction, depending on multiple factors. One factor may be ambient conditions of the air 58 (e.g., temperature, pressure, humidity, or precipitation). Another factor may be throttle of the turbine engine 200. More specifically, for the turbine engine 200, the rate of fuel introduced into the combustor 26 affects the pressure of the combustion gases 66 and consequently impacts axial forces (e.g., thrust loads) on the HP spool 96, the LP spool 94, or the HP spool 96 and the LP spool 94. The forces in each of the LPC 22, the HPC 24, the HPT 28, and the LPT 30 act in different directions at different locations within the respective component. To counteract the various forward acting axial thrust loads and aft acting axial thrust loads, thrust pistons 202 act upon the LP spool 94 and the HP spool 96. The sum of forces acting on the LP spool 94 due to operation of the LPC 22 and the LPT 30 apply a resultant force on the LP spool 94. Similarly, the sum of forces acting on the HP spool 96 due to operation of the HPC 24 and the HPT 28 apply a resultant force on the HP spool 96.

The resultant force on the LP spool 94 and the resultant force on the HP spool 96 depends on the physical state conditions of the core air flow 33, and the operating conditions of the turbine engine 10. For example, a higher density of the core air flow 33 may increase the force induced on each of the HPC 24 and the LPC 22, whereas the rate of fuel consumption may increase force on the HPT 28 and the LPT 30. Because these forces are variable, the resultant forces on each of the HP spool 96 and the LP spool 94 are also variable.

The turbine engine 200 includes one or more thrust bearings 204 to support thrust loads on the fan 38, the LP spool 94, and the HP spool 96. In addition to the thrust bearings 204, multiple thrust pistons 202 within the turbine engine 200 support the axial loads of the fan 38, the axial loads of the LP spool 94 and the axial load of the HP spool 96 on the thrust bearings 204. The one or more thrust pistons 202 increase the service life of the thrust bearings 204. Each thrust piston 202 is a cavity including a piston cavity fluid 208 under pressure to apply a compensatory reaction force on the fan 38, the LP spool 94, or the HP spool 96 at or near locations where the aforementioned axial forces act on the fan 38, the LP shaft 36, or the HP spool 96, respectively. The piston cavity fluid 208 may be compressed air 65 sourced from the LPC 22, the HPC 24, both the LPC 22 and the HPC 24, or from any other suitable source of pressurized piston cavity fluid 208. Alternatively, the piston cavity fluid 208 may be water vapor provided by the water system 92 or may be liquid water provided by the water system 92, as will be discussed later.

The thrust pistons 202 are defined in part by a fixed enclosure portion 210 and in part by a rotating boundary portion 212. The rotating boundary portion 212 may be a portion of the LP spool 94 or the HP spool 96 that rotates due to operation of the turbine engine 200, against which the piston cavity fluid 208 acts axially. The fixed enclosure portion 210 and the rotating boundary portion 212 meet at one or more piston cavity interfaces 214. The piston cavity interfaces 214 may include one or more seals, bearings, or defined gaps to allow for rotation of the rotating boundary portion 212 relative to the fixed enclosure portion 210. Together, the fixed enclosure portion 210, the rotating boundary portion 212, and the piston cavity interfaces 214 generally contain the piston cavity fluid 208 under pressure so as to generate the axial force on the LP spool 94 or the HP spool 96. The piston cavity interfaces 214 may allow for a defined leak rate of the piston cavity fluid 208 through the piston cavity interfaces 214, while still maintaining pressure in the thrust piston 202. Accordingly, the piston cavity interfaces 214 may be a defined gap.

The thrust pistons 202 act similarly upon the LP spool 94 and the HP spool 96 at various locations within the turbine engine 200. The thrust pistons 202 each may apply a force in the forward direction or in the aft direction on the LP spool 94 or on the HP spool 96. The direction of the force applied by each thrust piston 202 depends on the location of the thrust piston 202, in relation to the turbine engine 200 or its internal components, and, thus, which direction the compressed air 65 or the combustion gases 66, act upon the LP spool 94 or the HP spool 96.

Other turbine engine inputs may affect the component forces and the total forces on the LP spool 94 and the HP spool 96. Such inputs include, but are not limited to, direct injection of steam from a water system 92 into the core air flow 33 at one or more locations. Such injection of steam may be performed in order to increase mass flow, thus increasing energy in the HPT 28, the LPT 30, or both the HPT 28 and the LPT 30. Such steam may come from a waste heat recovery system, an onboard water supply, or any other suitable source. Steam injection may be variable, and as such steam injection results in a variable resultant axial force on the LP spool 94, the HP spool 96, or both the LP spool 94 and the HP spool 96.

Figure 3:
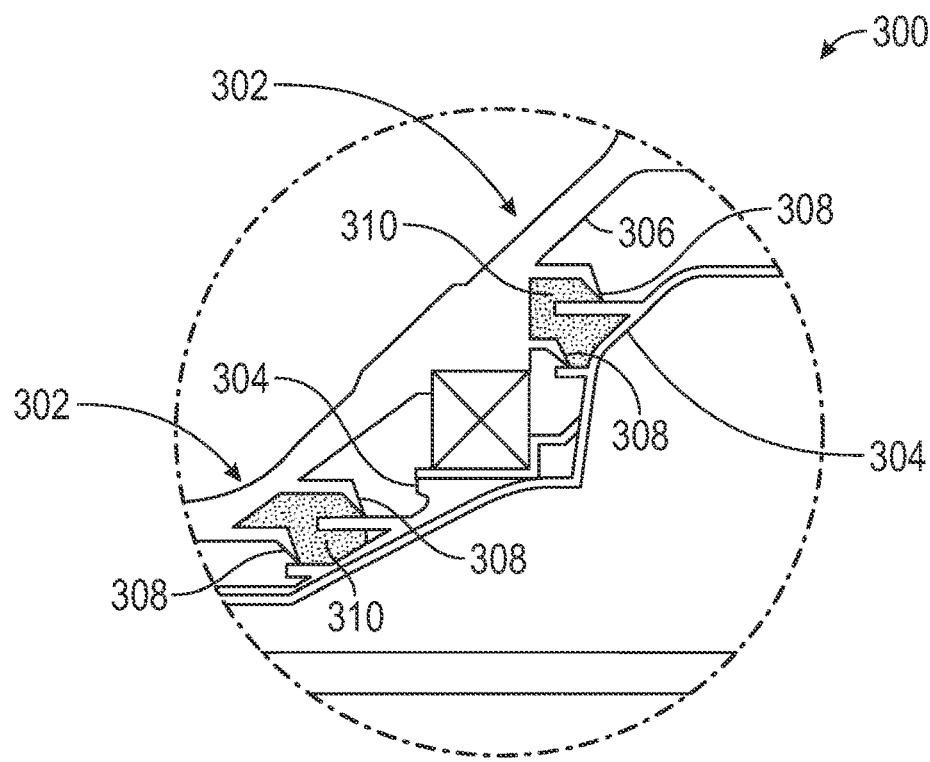
FIG. 3 is a detailed schematic view of multiple thrust cavities, according to an embodiment of the disclosure.

FIG. 3 shows a detailed schematic view of a forward area 300 of the turbine engine 200, including two fan (piston) cavities 302. Each of the fan cavities 302 is defined by a fan rotating boundary portion 304 and by a fan cavity fixed enclosure portions 306. The fan rotating boundary portions 304 may be one or more components of the fan 38. Each of four fan cavity interfaces 308 between the fan rotating boundary portion 304 and the fan cavity fixed enclosure portion 306 contains a seal. The LPC 22 provides pressurized a fan piston cavity fluid 310. The fan piston cavity fluid 310 acts in the aft direction on the fan 38.

Figure 4:
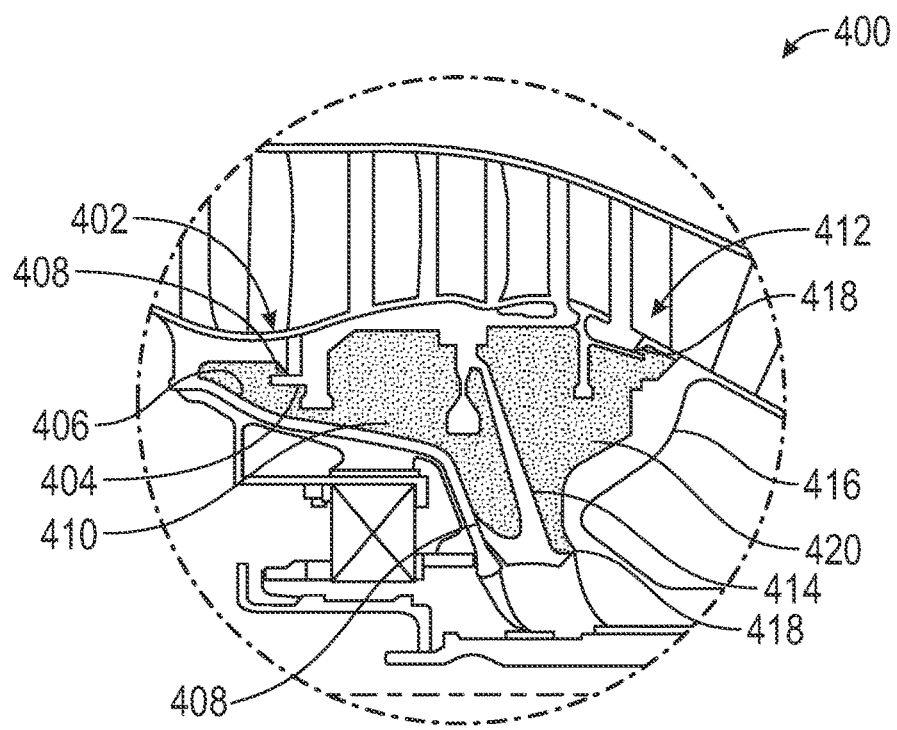
FIG. 4 is a detailed schematic view of multiple thrust cavities, according to an embodiment of the disclosure.

FIG. 4 shows a detailed schematic view of an LPC area 400 of the turbine engine 200, including a forward booster piston cavity and an aft booster piston cavity, alternatively referred to as an LPC forward cavity 402 and an LPC aft cavity 412, respectively. The LPC forward cavity 402 is defined by an LPC forward rotating boundary portion 404 and an LPC forward cavity fixed enclosure portion 406. The LPC forward rotating boundary portion 404 may be a rotating portion of the LPC 22. Each of two LPC forward cavity interfaces 408 between the LPC forward rotating boundary portion 404, and the LPC forward cavity fixed enclosure portion 406 contains a seal. The LPC 22 provides a pressurized LPC forward piston cavity fluid 410. The LPC forward piston cavity fluid 410 acts in the aft direction on the LP spool 94. The LPC aft cavity 412 is defined by an LPC aft rotating boundary portion 414 and an LPC aft cavity fixed enclosure portion 416. The LPC aft rotating boundary portion 414 may be a rotating portion of the LPC 22. Each of two LPC aft cavity interfaces 418 between the LPC aft rotating boundary portion 414 and the LPC aft cavity fixed enclosure portion 416 contains a seal. The LPC 22 provides a pressurized LPC aft piston cavity fluid 420. The LPC aft piston cavity fluid 420 acts in the forward direction on the LP spool 94.

Figure 5:
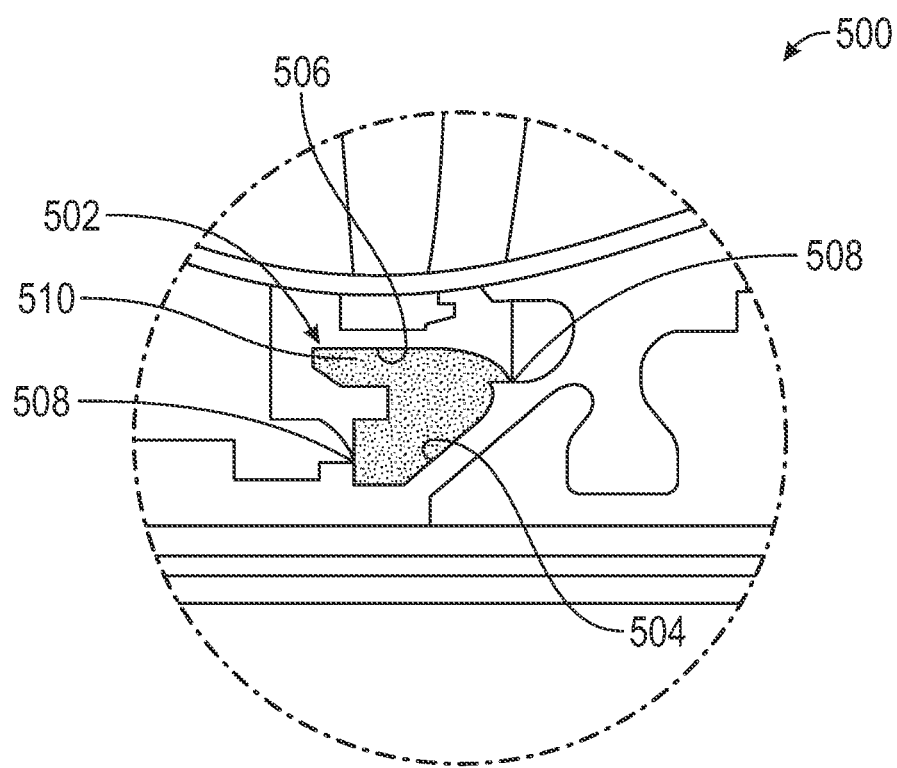
FIG. 5 is a detailed schematic view of a thrust cavity, according to an embodiment of the disclosure.

FIG. 5 shows a detailed schematic view of a forward area 500 of the turbine engine 200, including an HPC forward (piston) cavity 502. The HPC forward cavity 502 is defined by an HPC forward rotating boundary portion 504 and an HPC forward cavity fixed enclosure portion 506. The HPC forward rotating boundary portion 504 may be a rotating portion of the HPC 24. Each of two HPC forward cavity interfaces 508 between the HPC forward rotating boundary portion 504, and the HPC forward cavity fixed enclosure portion 506 contains a seal. The HPC 24 provides a pressurized HPC forward piston cavity fluid 510. The HPC forward piston cavity fluid 510 acts in the aft direction on the HP spool 96.

Figure 6:
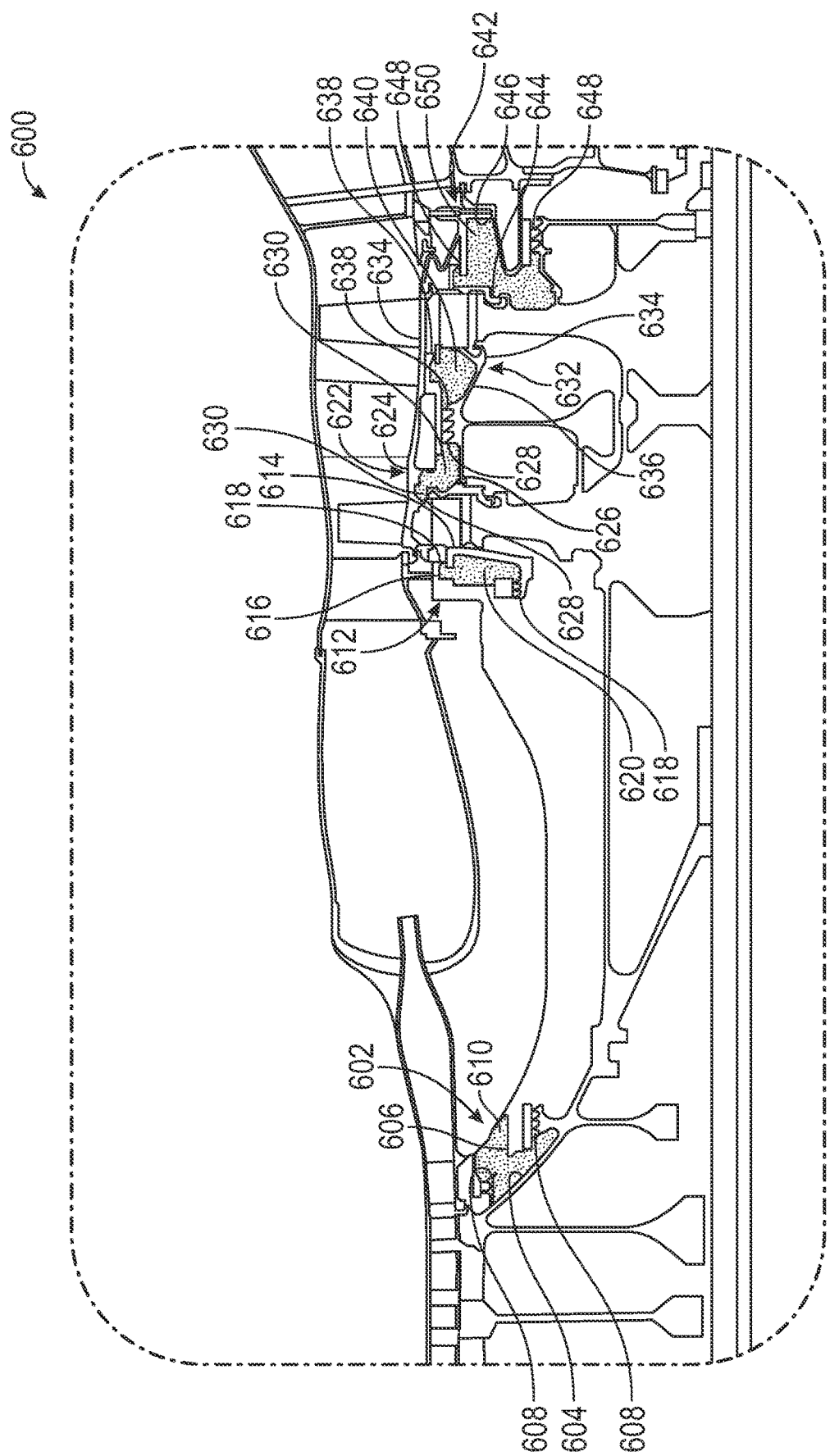
FIG. 6 is a detailed schematic view of multiple thrust cavities, according to an embodiment of the disclosure.

FIG. 6 shows a detailed schematic view of an intermediate area 600 of the turbine engine 200, including an HPC aft (piston) cavity 602, which may alternatively be referred to as a compressor discharge cavity. The HPC aft cavity 602 is defined by an HPC aft rotating boundary portion 604 and an HPC aft cavity fixed enclosure portion 606. The HPC aft rotating boundary portion 604 may be a rotating portion of the HPC 24. Each of two HPC aft cavity interfaces 608 between the HPC aft rotating boundary portion 604, and the HPC aft cavity fixed enclosure portion 606 contains a seal. The HPC 24 provides a pressurized HPC aft piston cavity fluid 610. The HPC aft piston cavity fluid 610 acts in the forward direction on the HP spool 96.

The intermediate area 600 shown in FIG. 6 also includes a forward outer seal piston cavity, which may alternatively be referred to as a Forward Outer Seal (FOS) cavity, or an HPT forward (piston) cavity 612. The HPT forward cavity 612 is defined by an HPT forward rotating boundary portion 614 and an HPT forward cavity fixed enclosure portion 616. The HPT forward rotating boundary portion 614 may be a rotating portion of the HPT 28. Each of two HPT forward cavity interfaces 618 between the HPT forward rotating boundary portion 614, and the HPT forward cavity fixed enclosure portion 616 contains a seal. The HPC 24 provides a pressurized HPT forward piston cavity fluid 620. The HPT forward piston cavity fluid 620 acts in the aft direction on the HP spool 96.

The intermediate area 600 shown in FIG. 6 also includes an HPT forward interstage (piston) cavity 622 and an HPT aft interstage (piston) cavity 632. The forward interstage cavity 622 is defined by a forward interstage rotating boundary portion 624 and a forward interstage cavity fixed enclosure portion 626. The forward interstage rotating boundary portion 624 may be a rotating portion of the HPT 28. Each of two forward interstage cavity interfaces 628 between the forward interstage rotating boundary portion 624 and the forward interstage cavity fixed enclosure portion 626 contains a seal. The HPC 24 provides a pressurized forward interstage piston cavity fluid 630. The forward interstage piston cavity fluid 630 acts in the aft direction on the HP spool 96. The aft interstage cavity 632 is defined by an aft interstage rotating boundary portion 634 and an aft interstage cavity fixed enclosure portion 636. The aft interstage rotating boundary portion 634 may be a rotating portion of the HPT 28. Each of two aft interstage cavity interfaces 638 between the aft interstage rotating boundary portion 634 and the aft interstage cavity fixed enclosure portion 636 contains a seal. The HPC 24 provides a pressurized aft interstage piston cavity fluid 640. The aft interstage piston cavity fluid 640 acts in the forward direction on the HP spool 96.

The intermediate area 600 shown in FIG. 6 also includes an HPT aft (piston) cavity 642. The HPT aft cavity 642 is defined by an HPT aft rotating boundary portion 644 and an HPT aft cavity fixed enclosure portion 646. The HPT aft rotating boundary portion 644 may be a rotating portion of the HPT 28. Each of two HPT aft cavity interfaces 648 between the HPT aft rotating boundary portion 644 and the HPT aft cavity fixed enclosure portion 646 contains a seal. The HPC 24 provides a pressurized HPT aft piston cavity fluid 650. The HPT aft piston cavity fluid 650 acts in the forward direction on the HP spool 96.

Figure 7:
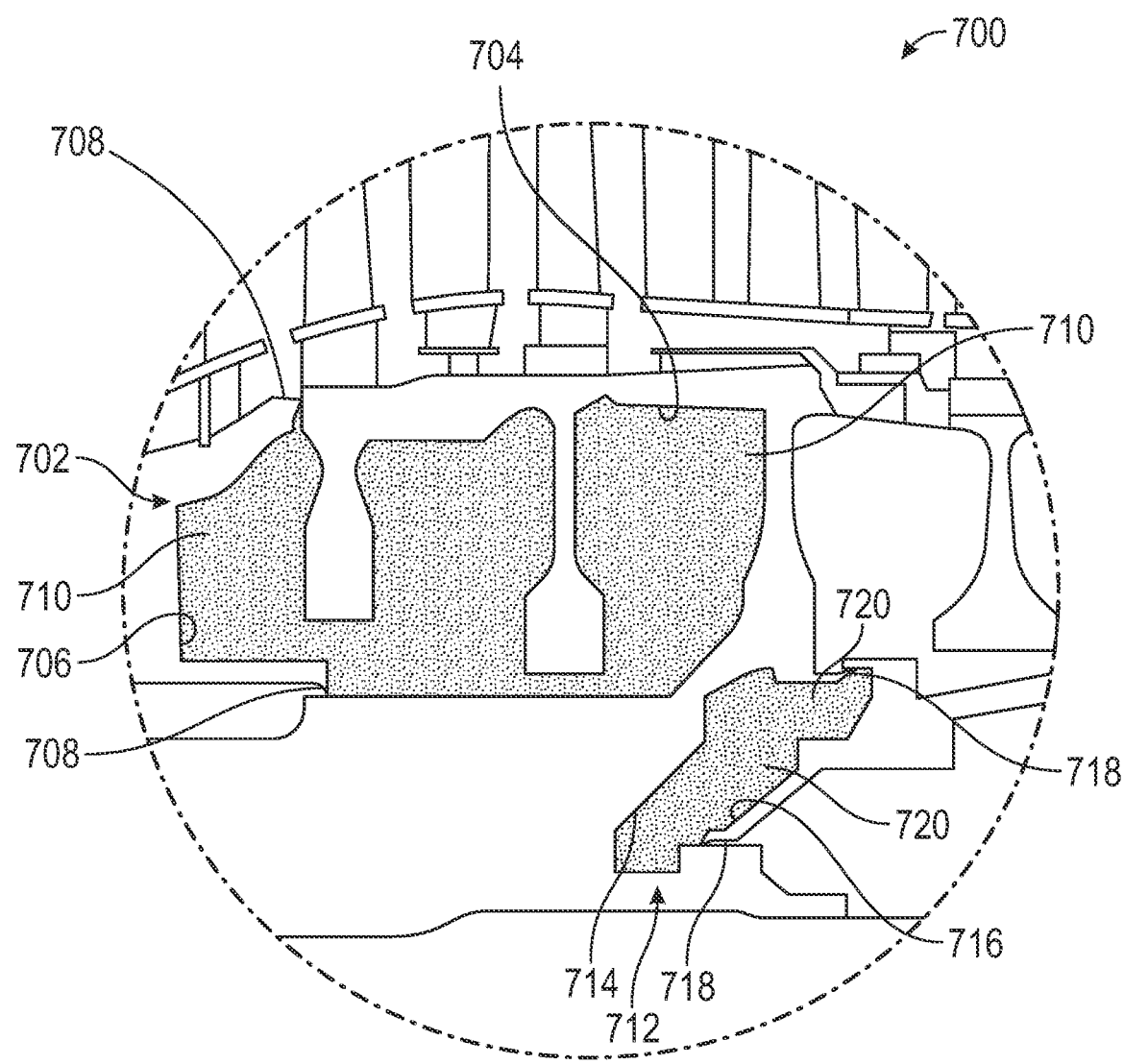
FIG. 7 is a detailed schematic view of multiple thrust cavities, according to an embodiment of the disclosure.

FIG. 7 shows a detailed schematic view of an aft area 700 of the turbine engine, including an LPT forward (piston) cavity 702 and an LPT aft (piston) cavity 712. The LPT forward cavity 702 is defined by an LPT forward rotating boundary portion 704 and an LPT forward cavity fixed enclosure portion 706. The LPT forward rotating boundary portion 704 may be a rotating portion of the LPT 30. Each of two LPT forward cavity interfaces 708 between the LPT forward rotating boundary portion 704 and the LPT forward cavity fixed enclosure portion 706 contains a seal. The LPC 22 provides a pressurized LPT forward piston cavity fluid 710. The LPT forward piston cavity fluid 710 acts in the aft direction on the LP spool 94. The LPT aft cavity 712 is defined by an LPT aft rotating boundary portion 714 and an LPT aft cavity fixed enclosure portion 716. The LPT aft rotating boundary portion 714 may be a rotating portion of the LPT 30. Each of two LPT aft cavity interfaces 718 between the LPT aft rotating boundary portion 714 and the LPT aft cavity fixed enclosure portion 716 contains a seal. The LPC 22 provides a pressurized LPT aft piston cavity fluid 720. The LPT aft piston cavity fluid 720 acts in the forward direction on the LP spool 94.

Figure 8:
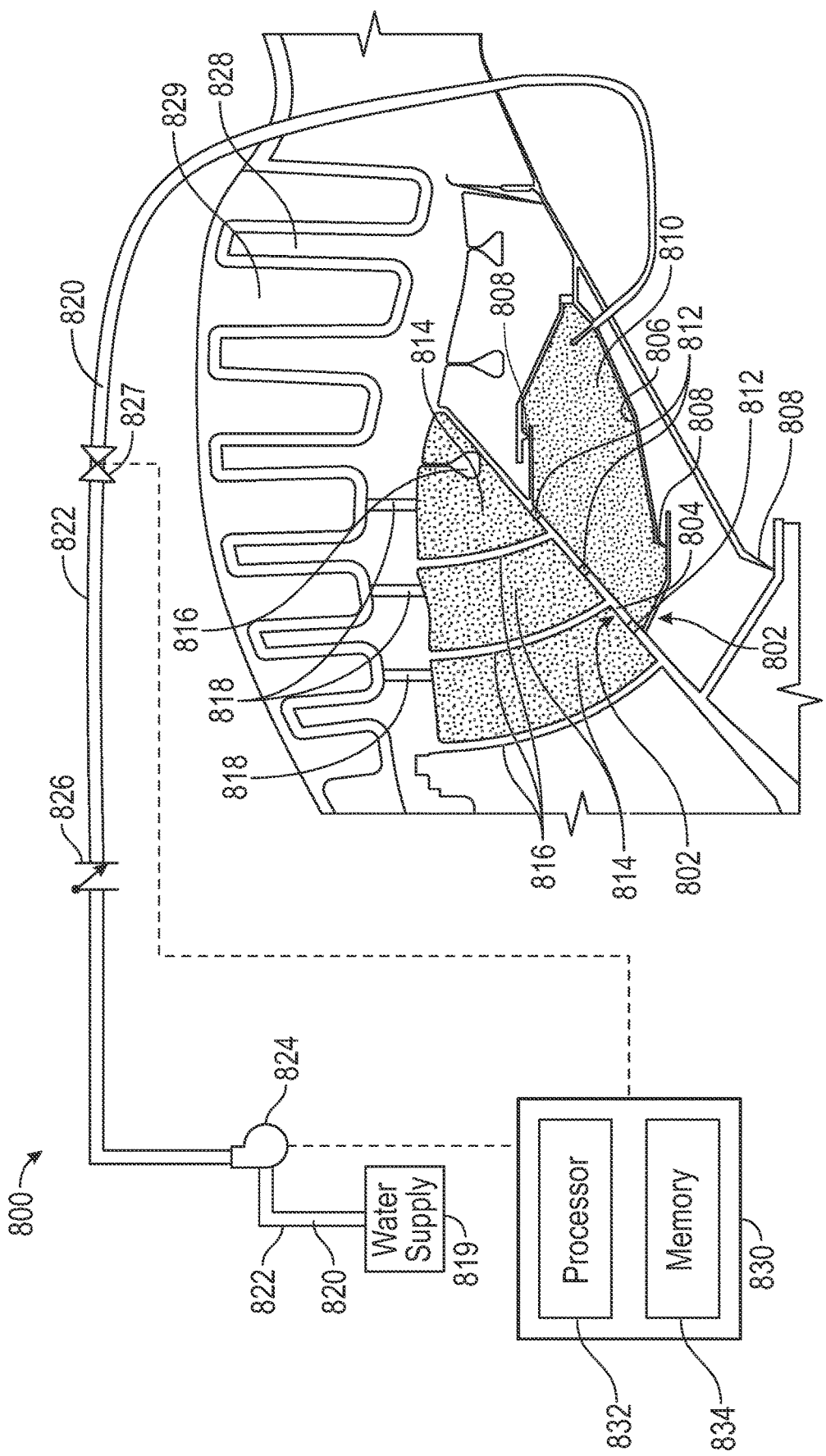
FIG. 8 is a schematic view of a balance piston system, according to an embodiment of the disclosure.

FIG. 8 shows a schematic view of an LP balance piston system 800, including an LP balance piston (cavity) 802. As described previously, the thrust pistons 202 (FIG. 2) applied to the fan 38, to the LP spool 94, and to the HP spool 96 each supports a portion of the axial forces applied by the compressed air 65 and the combustion gases 66, flowing through the turbine engine 10 and the turbine engine 200 on the respective fan or spool. The axial forces are variable due to variations in the operation of the turbine engine 200. The thrust pistons 202 alone may not provide appropriate axial reaction force on the LP spool 94 to adequately reduce the resultant axial force on the LP spool 94 to a force that can safely and adequately be supported by the thrust bearings 204. The LP balance piston 802, acting upon the LP spool 94, compensates for the resultant axial thrust load by applying an axial reaction force on the LP spool 94.

To balance the forces on the LP spool 94, one or more of the thrust pistons 202 acting on the LP spool 94, such as the LPT aft cavity 712, may serve as the LP balance piston 802. Alternatively, the LP balance piston 802 may be in the location of the LPC forward cavity 402, the LPC aft cavity 412, or the LPT forward cavity 702. Alternatively, the LP balance piston 802 may be an additional cavity located elsewhere within the turbine engine 200. As described previously with respect to other thrust pistons 202, the LP balance piston cavity includes an LP balance piston rotating boundary portion 804 and an LP balance piston cavity fixed enclosure portion 806 that meet at LP balance piston cavity interfaces 808 to contain a pressurized LP balance piston fluid 810. The LP balance piston cavity interfaces 808 as shown in FIG. 8 are seals, but may alternatively be seals, bearings, gaps, or any combination thereof, through which the LP balance piston fluid 810 passes at a defined acceptable leak rate.

The LP balance piston 802 serves to counteract the resultant axial force on the LP spool 94 through the pressurized LP balance piston fluid 810 that acts axially on the LP balance piston rotating boundary portion 804. The LP balance piston 802 is adjustable, allowing for the pressure of the LP balance piston fluid 810 on the LP spool 94 to be raised or lowered, which adjusts the force applied by the LP balance piston 802 on the LP spool 94 in response to changes in operating conditions of the turbine engine 200. By incorporating the LP balance piston 802, the thrust bearings 204 applied to the LP spool 94 support a lesser axial load applied on the LP spool 94 and minor variation caused by operation of the turbine engine 200, such as vibrations. The thrust bearings 204 applied to the LP spool 94 are better able to support such lesser axial loading, and, as such, have increased performance, increased service life, or both increased performance and increased service life relative to similar thrust bearings 204, as would be applied in an otherwise equivalent engine without the LP balance piston 802.

Additionally, the LP balance piston rotating boundary portion 804 may include one or more passages 812 allowing for liquid or gaseous LP balance piston fluid 810 to pass through the LP balance piston rotating boundary portion 804, into a secondary cavity 814, exposing the LP balance piston fluid 810 to additional components of the turbine engine 200. The secondary cavity 814 may be one or more secondary cavities 814. Such exposed components may include the LP shaft 36, one or more LPT rotor disks 816, or other components, depending on the location and orientation of the one or more passages 812.

The LP balance piston system 800 includes multiple components for providing water to the LP balance piston 802. A water supply 819 provides a source of liquid water 820 to the LP balance piston 802. A water line 822 provides the water 820 from the water supply 819 to at least one water pump 824. The water pump 824 provides a flow of the water 820 through the water line 822 to the LP balance piston 802. The water line 822 includes one or more check valves 826 disposed between the water pump 824 and the LP balance piston 802 that prevent a reverse flow of the water 820 (liquid or vapor) through the water line 822. The water line 822 further connects to the LP balance piston 802, providing the piston with a source of liquid water 820.

Once introduced to the LP balance piston 802, the water 820 becomes the LP balance piston fluid 810 and absorbs heat from adjacent components. Specifically, the LP balance piston fluid 810 absorbs heat from the relatively hotter components, including the LP balance piston rotating boundary portion 804, the LP shaft 36, the LP balance piston cavity fixed enclosure portion 806, and the LP balance piston cavity interfaces 808, whereupon the LP balance piston fluid 810 evaporates, converting partially or entirely from liquid water to steam, by absorbing heat from the adjacent components. Therefore the LP balance piston fluid 810 may be supercritical steam or may be subcritical steam. Subcritical steam is also referred to as two-phase steam.

The water system 92 may include a waste heat recovery system, a dedicated onboard water supply, or any other suitable water source. By controlling the flow rate of the water 820 into the LP balance piston 802, the axial pressure, and therefore the axial force applied on the LP balance piston rotating boundary portion 804 is adjustable. The pressure applied on the LP balance piston rotating boundary portion 804 is additionally affected by the rate of temperature difference between adjacent components, such as, for example, the LP balance piston rotating boundary portion 804 to the LP balance piston fluid 810, as well as by the flow rate of the LP balance piston fluid 810 through the LP balance piston 802.

As discussed, the LP balance piston 802 may also contain the one or more passages 812 that allow flow of the LP balance piston fluid 810 through the LP balance piston rotating boundary portion 804, and into the one or more secondary cavities 814. Upon entering the secondary cavity 814, the LP balance piston fluid 810 is further exposed to heated elements of the turbine engine 200, including the LPT rotor disks 816. Upon exposure to the LPT rotor disks 816, the LP balance piston fluid 810 absorbs additional heat, now from the LPT rotor disks 816. In the case of two-phase steam as the LP balance piston fluid 810, the LP balance piston fluid 810 will increase in quality, potentially becoming supercritical, and, in the case of supercritical steam as the LP balance piston fluid 810, the LP balance piston fluid 810 will increase in temperature. Heat transfers from the components within the secondary cavity 814 to the LP balance piston fluid 810. This heat transfer occurs whether the LP balance piston fluid 810 is two-phase steam or supercritical steam and lowers the temperature of the components of the secondary cavity 814.

In order to facilitate heat transfer, the LP rotor disks 816 may be attached to the LP balance piston rotating boundary portion 804, as shown in FIG. 8. By being attached to the LP balance piston rotating boundary portion 804, the secondary cavity 814 may be separated into the one or more secondary cavities 814. The one or more secondary cavities 814 may fluidly communicate with one another via passages (not shown) through the LP rotor disks 816.

Exiting the secondary cavity 814, the LP balance piston fluid 810 further flows through one or more passages 818 in the LP spool 94 to the LPT 30, wherein the LP balance piston fluid 810 mixes with the combustion gases 66. Such introduction of steam into the LPT 30 may increase the overall energy generation of the LPT 30 for the reasons previously discussed. Multiple passages 818 may be required to allow the LP balance piston fluid 810 to flow out of the each of the one or more secondary cavities 814, when there is more than one secondary cavity.

The conversion of the LP balance piston fluid 810 from liquid to vapor creates pressure in the LP balance piston 802 to counteract the resultant force on the LP spool 94 from the turbine engine 200 operation, including the thrust pistons 202. Upon contact with heated surfaces of, for example, the LP balance piston rotating boundary portion 804, heat transfers from the LP balance piston rotating boundary portion 804 to the LP balance piston fluid 810, causing the LP balance piston fluid 810 to evaporate to steam, expanding the LP balance piston fluid and increase in pressure. The pressure applied by the expanded LP balance piston fluid 810 acts upon the LP balance piston rotating boundary portion 804 and supports a portion of the axial load on the LP spool 94.

As described above with respect to the thrust pistons 202, the LP balance piston cavity interfaces 808 may be gaps. The LP balance piston cavity interfaces 808 allow a defined leak rate of the LP balance piston fluid 810 through the LP balance piston 802 while still maintaining adequate pressure in the LP balance piston 802 to axially support the LP spool 94. The LP balance piston fluid 810 provided by the water supply 819 is cooler than the components of the LP balance piston 802 (e.g., the LP balance piston rotating boundary portion 804). By flowing continuously through the LP balance piston 802 and out through the LP balance piston cavity interfaces 808, the LP balance piston fluid 810 provides continuous heat transfer away from the LP balance piston 802. The LP balance piston fluid 810 cools the LP spool 94 by conductive heat transfer. Heat in the LP spool 94 travels from the warmer portions, including the LPT 30, to the cooled portions including the LP balance piston rotating boundary portion 804.

To maintain continuous heat transfer to the LP balance piston fluid 810, a continuous flow of the LP balance piston fluid 810 is necessary. To facilitate such flow and such continuous heat transfer, the LP balance piston rotating boundary portion 804 includes one or more passages 812, allowing for the LP balance piston fluid 810 to pass out of the LP balance piston 802 and into the secondary cavity 814, wherein the LP balance piston fluid 810 may contact and further absorb heat from additional portions of the LP spool 94. Such gaps may be present in addition to, or as an alternative to, a defined leak through the LP balance piston cavity interfaces 808. Such additional portions of the LP spool 94 include the LPT rotor disks 816 and the LP shaft 36. After flowing through the secondary cavity 814 and having further absorbed heat from the additional portions of the LP spool 94, the LP balance piston fluid 810 flows out of the secondary cavity 814 through the one or more passages 818.

The passages 818 allow for the outflow of the LP balance piston fluid 810 from the secondary cavity 814 to the path of the combustion gases 66 in the LPT 30. Steam introduced into the LPT 30 will increase mass flow through the LPT 30, thus increasing the energy generated therein. Additionally, further heat transfer to the gaseous LP balance piston fluid 810 from the LPT 30 will lower the temperature of the combustion gases 66 within the LPT 30, which reduces the risk of damage to the LPT components, such as LPT rotor blades 828 and LPT stator vanes 829.

Alternatively, the LP balance piston fluid 810 may flow through passages from the secondary cavity 814, to be expelled from the turbine engine 200, bypassing the core air flow 33 (not shown). Alternatively, in the case of a closed loop water system 92, the LP balance piston fluid 810 may recondense in a condenser (not shown) and return to the water supply 819 as liquid water 820. All of the passages 812 and the passages 818 are sized to ensure a greater pressure within the LP balance piston 802 than within the secondary cavity 814, allowing the LP balance piston 802 to continue to apply axial force to the LP spool 94.

The at least one water pump 824 causes liquid water from the water supply 819 to flow through the water line 822, whereupon reaching the LP balance piston 802, the liquid water becomes the LP balance piston fluid 810. A benefit of pumping liquid water 820 into the LP balance piston 802 and converting to a pressurized gas once in the LP balance piston 802 is that, due to its nearly incompressible state, liquid water may be pumped at lower pressures than the equivalent gas (water vapor or air) pump would require. An additional benefit of causing liquid or gaseous water to flow into the LP balance piston 802 is that, by absorbing thermal energy in the phase change from liquid to vapor within the LP balance piston 802, the LP balance piston fluid 810 cools adjacent components such as the LP balance piston rotating boundary portion 804. Cooling such adjacent components may contribute to prolonged life of the turbine engine 200 or improved operational performance of the turbine engine 200.

The water line 822 may include the one or more check valves 826, also known as non-return valves, and one or more flow control valves 827. As discussed, the check valves 826 ensure that the heated or pressurized water vapor does not flow backwards, into the water pump 824, which could damage the water pump 824. Additionally, the one or more check valves 826 ensure that a backflow of liquid water or steam cannot introduce heat to portions of the turbine engine 200 or water system 92 that are unable to tolerate such heat. Further, the one or more check valves 826 ensure the proper direction of flow of the LP balance piston fluid 810 in the LP balance piston 802, which helps ensure the heat transfer to the LP balance piston fluid 810.

The LP balance piston system 800 includes a controller 830. As the resultant axial force on the LP spool 94 is variable, as previously discussed, the controller 830 controls the speed of the water pump 824 and adjusts the flow control valve 827 in order to control the outlet flow of the water 820 from the water pump 824 to the LP balance piston 802. The controller controls the flow of the water 820 in such a manner as to adjust the pressure applied by the LP balance piston fluid 810 on the LP balance piston rotating boundary portion 804 and controlling the axial force of the LP balance piston 802 on the LP spool 94. Such control of the axial force applied by the LP balance piston 802 on the LP spool 94 is necessary to adjust to changing operational conditions of the turbine engine 200. In addition to sending control data to the water pump 824 and to the flow control valve 827, the controller 830 receives data from the water pump 824 and from the flow control valve 827. The data from the water pump 824 and the data from the flow control valve 827 may include pressure and/or flow rates therethrough. The controller 830 may detect certain system faults, such as, for example, a broken water line 822 resulting in a loss of water 820, by monitoring the data from the water pump 824 and/or the flow control valve 827.

The controller 830 may be an engine controller. The controller 830 is configured to operate various aspects of the turbine engine 200, including, in the embodiments discussed herein, the LP balance piston system 800 and its constituent components. The controller 830 may be a Full Authority Digital Engine Control (FADEC). In this embodiment, the controller 830 is a computing device having one or more processors 832 and one or more memories 834. The processor 832 may be any suitable processing device, including, but not limited to, a microprocessor, a microcontroller, an integrated circuit, a logic device, a programmable logic controller (PLC), an application-specific integrated circuit (ASIC), and/or a Field Programmable Gate Array (FPGA). The memory 834 may include one or more computer-readable media, including, but not limited to, non-transitory computer-readable media, a computer-readable non-volatile medium (e.g., a flash memory), a RAM, a ROM, hard drives, flash drives, and/or other memory devices.

The memory 834 may store information accessible by the processor 832, including computer-readable instructions that may be executed by the processor 832. The instructions may be any set of instructions or a sequence of instructions that, when executed by the processor 832, causes the processor 832 and the controller 830 to perform operations. In some embodiments, the instructions may be executed by the processor 832 to cause the processor 832 to complete any of the operations and functions for which the controller 830 is configured, as described herein. The instructions may be software written in any suitable programming language or may be implemented in hardware. Additionally or alternatively, the instructions may be executed in logically and/or virtually separate threads on the processor 832. The memory 834 may further store data that may be accessed by the processor 832. The memory 834 may apply certain rules or control logic, which control the apportionment of fuel and steam. Such rules may apply to engine power, emissions targets, engine safety parameters, engine efficiency, or any other such relevant measurable output.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between components and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Increasing the water flow rate in the water system 92 may increase the pressure of the LP balance piston fluid 810 in the LP balance piston 802, applying greater axial pressure (therefore, a greater axial force) on the LP spool 94. The water pump 824, and the one or more flow control valves 827 may be adjusted to allow a greater or a lesser flow rate of water through the LP balance piston 802. A greater flow rate may allow for more heat transfer from the turbine engine 200 components, by virtue of maintaining a greater temperature difference between the LP balance piston fluid 810 and adjacent components, such the LP balance piston rotating boundary portion 804. A lesser flow rate may allow for a greater pressure in the LP balance piston fluid 810, therefore, a greater pressure on the LP balance piston rotating boundary portion 804, and therefore a greater axial force applied on the LP spool 94 by the LP balance piston 802.

While FIG. 8 and the accompanying description reference the LP balance piston system 800 including the LP balance piston 802 that acts upon the LP spool 94, the foregoing description with respect to the LP balance piston system 800 may additionally or alternatively apply to a balance piston acting on the HP spool 96, with the same water system 92 or an additional water system that similarly serves to balance the axial forces on the HP spool 96 resulting from the internal forces of the compressed air 65, the combustion gases 66, and the external forces applied on the HP spool 96 by the thrust pistons 202.

While the LP balance piston 802 as shown in FIG. 8 acts upon the LP spool 94 in the forward direction, compensating for an aft thrust load on the shaft, an LP balance piston or an HP balance piston may be applied in such a manner as to act in the aft direction, to compensate for a forward load on the LP spool 94 or HP spool 96. Additionally, an LP spool 94 or an HP spool 96 may have both forward-acting pistons and aft-acting balance pistons, if the operational design of the engine is such that resultant axial forces to be compensated by the respective balance piston, are expected to reverse.

The forgoing description with respect to the LP balance piston system 800 of FIG. 8 may alternatively be applied to any of the thrust pistons 202 as described with respect to FIG. 2. In such cases, the water system 92 provides water that changes phase in the thrust piston 202 in the manner as described above with respect to the LP balance piston 802, providing a pressure in the thrust piston 202, and in turn a force on the LP spool 94 or the HP spool 96. In such cases, the thrust pistons 202 rather than applying a substantially static load, may apply a variable load by controlling pump speed and flow control valves as described above with respect to the LP balance piston system 800.

Figure 9:
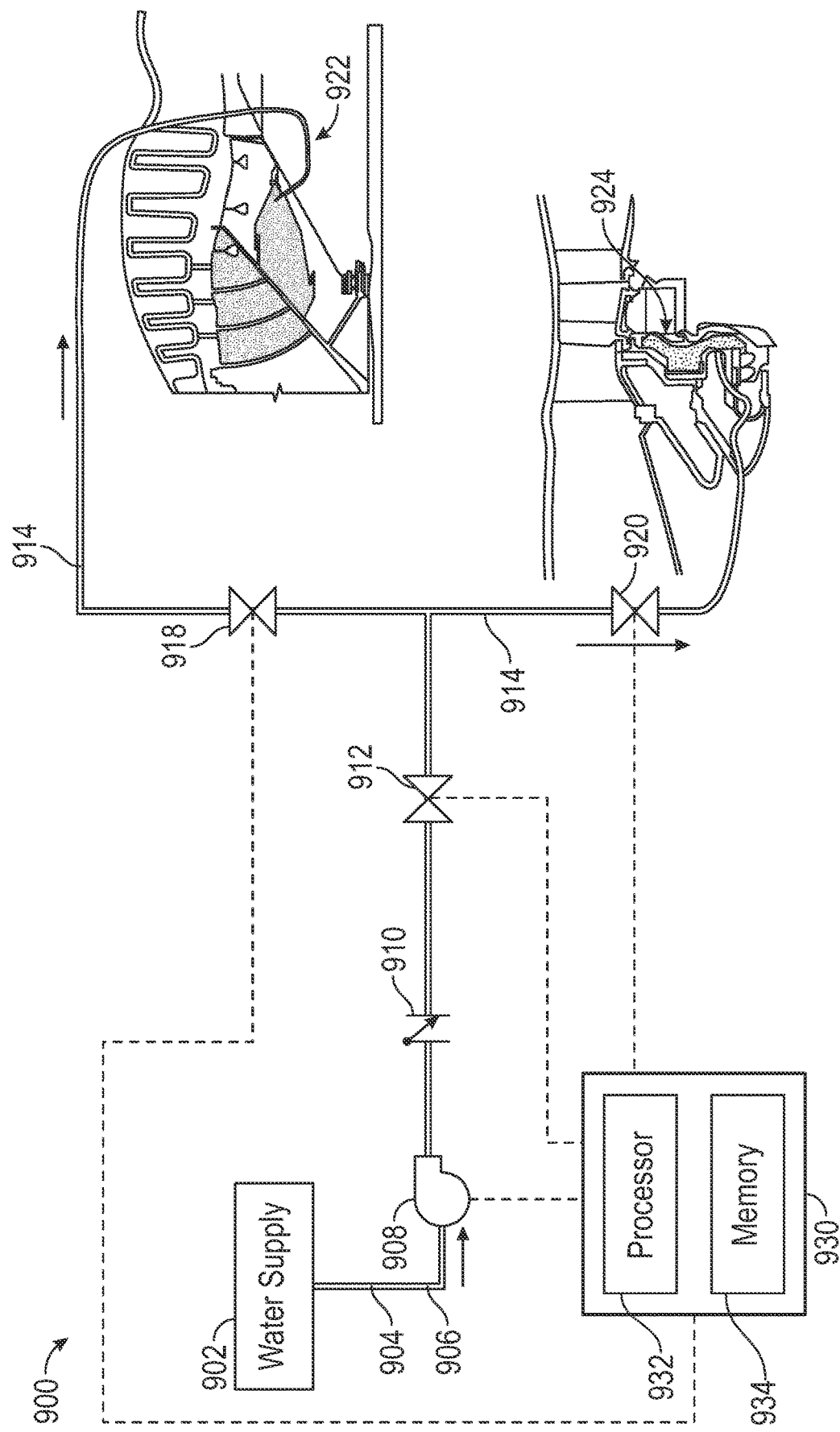
FIG. 9 is a schematic view of a balance piston system, according to an embodiment of the disclosure.

FIG. 9 shows a schematic view of a balance piston system 900 including both a first balance piston and a second balance piston. The first balance piston may be an LP balance piston 922 and the second balance piston may be an HP balance piston 924. The balance system includes a water supply 902, to provide water 906 through one or more water lines 904 to one or more water pumps 908. The one or more water pumps 908 generates a pressure, causing the water 906 to further flow through the water line 904 to the LP balance piston 922 and the HP balance piston 924. A check valve 910 prevents backflow in the water line 904 and a flow control valve 912 controls the rate of flow of the water 906 to the LP balance piston 922 and the HP balance piston 924. Such a system allows for a single source of the water 906 to supply both the LP balance piston 922 and the HP balance piston 924. A water supply line 914 with an LP flow control valve 918 located therein, supplies the water 906 to the LP balance piston 922, and may be independently adjusted by control of the LP flow control valve 918. Similarly, a water supply line 914 with an HP flow control valve 920 located therein, supplies the water 906 to the HP balance piston 924, and may be independently adjusted by control of the HP flow control valve 920.

The balance piston system 900 also includes a controller 930. The controller 930 contains a processor 932 and a memory 934. The foregoing description of the controller 830, the processor 832, and the memory 834 applies similarly to the controller 930, the processor 932, and the memory 934 respectively, for controlling a balance piston system 900. The controller 930 controls the pressure in the LP balance piston 922 and the pressure in the HP balance piston 924, by controlling the speed of the water pump 908, and by adjusting the settings of the flow control valve 912, the LP flow control valve 918, and the HP flow control valve 920. This control controls the rate and the pressure of the flow of the water 906 in the water line 904 to each of the LP balance piston 922 and the HP balance piston 924.

Further, the controller receives data from the water pump 908, the flow control valve 912, the LP flow control valve 918, and the HP flow control valve 920, which may be used for the detection of certain system faults, such as, for example, a broken water line 904 or a broken water supply line 914, resulting in a loss of the water 906, by monitoring the data from the water pump 908, the flow control valve 912, the LP flow control valve 918, and the HP flow control valve.

Figure 10:
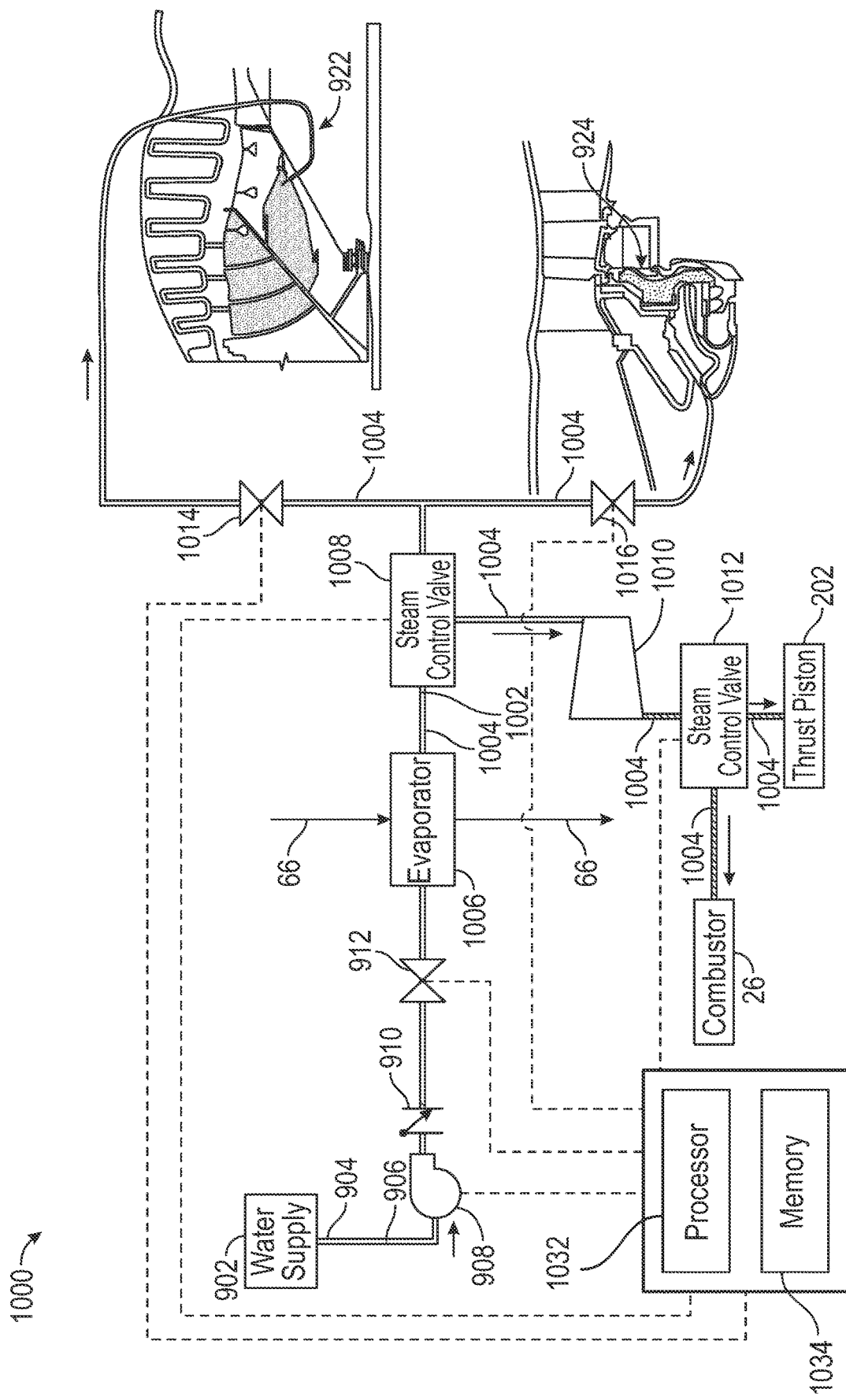
FIG. 10 is a schematic view of a balance piston system, according to an embodiment of the disclosure.

FIG. 10 shows a schematic view of an alternative balance piston system 1000 including the LP balance piston 922 and the HP balance piston 924. The balance piston system 1000 is substantially similar to the balance piston system 900, described with respect to FIG. 9, with the addition of an evaporator 1006 (a heat exchanger) that generates steam 1002 that flows to the LP balance piston 922, to the HP balance piston 924, and to a steam turbine 1010. The steam turbine 1010 further provides steam to the combustor 26, to one or more of the thrust pistons 202, or both to the combustor 26 and to one or more of the thrust pistons 202. Accordingly, the same reference numerals will be used for components of the balance piston system 1000 that are the same as or similar to the components of the balance piston system 900 discussed above. The description of these components above also apples to this embodiment, and a detailed description is omitted here.

Liquid water 906 is provided by the water supply 902 through the water line 904 to one or more water pumps 908. The water pump 908 pressurizes the liquid water 906, inducing a further flow of the liquid water 906 through the water line to the evaporator 1006. The evaporator 1006 converts the liquid water 906 to the steam 1002. The evaporator 1006 operates by receiving a flow of the combustion gases 66 from the LPT 30 or the HPT 28, at a higher temperature than the water 906. Heat transfer from the core air flow 33 to the liquid water 906 occurs within the evaporator (heat exchanger) 1006. The heat transfer, and resulting increase of temperature of the liquid water 906, causes conversion to the steam 1002. Following the evaporator 1006, the steam 1002 flows in a steam line 1004 first to a first steam control valve, or a first steam manifold 1008. The first steam manifold 1008 directs a portion of the steam 1002 to another steam line 1004 leading to the steam turbine 1010 and directs the remainder of the steam 1002 to other steam lines 1004 leading to the LP balance piston 922 and to the HP balance piston 924.

The steam lines 1004 provide the steam 1002 to the LP balance piston 922 and the HP balance piston 924. An LP flow control valve 1014 and an HP flow control valve 1016 independently control the flow rate of the steam 1002 in the steam lines 1004 to each of the LP balance piston 922 and the HP balance piston 924, respectively. This control allows for independent control of the force applied by each of the LP balance piston 922 and the HP balance piston 924.

The balance piston system 1000 also includes a controller 1030. The controller 1030 contains a processor 1032 and a memory 1034. The foregoing description of the controller 830, the processor 832, and the memory 834 applies similarly to the controller 1030, the processor 1032, and the memory 1034, respectively, for controlling the balance piston system 1000. The controller 1030 controls the pressure in the LP balance piston 922 and the pressure in the HP balance piston 924, by controlling the speed of the water pump 908, and by adjusting the settings of the flow control valve 912, the LP flow control valve 1014, and the HP flow control valve 1016. The controller 1030 also controls the settings of the first steam manifold 1008, which adjusts the apportionment of the steam 1002 to the steam turbine 1010. The controller 1030 also controls a second control valve, or second steam manifold 1012, to adjust the apportionment of the steam 1002 output by the steam turbine 1010 to the combustor 26, to the one or more of the thrust pistons 202, or to both the combustor 26 and to the one or more of the thrust pistons 202. The controller 1030 controls the rate and the pressure of the flow of the water 906 in the water line 904 to the evaporator 1006 and the flow of the steam 1002 in the steam lines 1004 to each of the LP balance piston 922 and the HP balance piston 924.

The controller 1030 may additionally detect system failures, such as, for example, a broken water line 904 resulting in a loss of the water 906, through data received from the water pump 908, and/or the flow control valve 912. Additionally, the controller may detect system failures, such as, for example a broken steam line 1004 resulting in a loss of the steam 1002, through data received from the first steam manifold 1008, the LP flow control valve 1014, the HP flow control valve 1016, and/or the steam control valve 1012.

The steam turbine 1010 extracts thermal energy, kinetic energy, or both thermal energy and kinetic energy from the steam 1002. The energy may contribute to rotation of the LP spool 94 or the HP spool, or may be converted into an alternative form of energy (e.g., electrical energy) for use outside of the turbine engine. Upon exiting the steam turbine 1010, the steam 1002 flows through the second steam manifold 1012. The second steam manifold apportions the steam 1002 flowing from the steam turbine 1010, through additional separate steam lines 1004 to the combustor 26, to one or more of the thrust pistons 202, or to both the combustor 26 and to one or more of the thrust pistons 202. The introduction of the steam 1002 to the combustor 26 may enhance performance of the HPT 28, the LPT 30, or both the HPT 28 and the LPT 30. The provision of the steam to one or more of the thrust pistons 202 may provide an alternative source of the piston cavity fluid 208 for support of the LP spool 94 or the HP spool 96.

While the embodiments shown include a single balance piston on each of the LP spool 94 and the HP spool 96, embodiments are contemplated with more than one balance piston on the LP spool 94, the HP spool 96, or both the LP spool 94 and the HP spool 96. In such embodiments, one or more of the thrust pistons 202 may function as balance piston cavities, with controlled water flow that in turn controls the pressure applied by the piston cavity fluid on the respective rotating boundary portion.

Further aspects are provided by the subject matter of the following clauses.

A turbine engine comprises a spool, the spool comprising a compressor that compresses core air, a turbine, and a shaft connecting the compressor and the turbine such that the compressor and the turbine rotate together, a fuel supply, a combustor located downstream of the compressor that receives the core air and the fuel supply and combusts the core air and the fuel supply to generate combustion gases, the combustion gases flowing to the turbine, causing rotation of the turbine, the core air, the combustion gases, the compressor, and the turbine generating a first axial force on the spool, a balance piston that applies a second axial force on the spool to balance at least a portion of the first axial force, the balance piston comprising a rotating boundary portion comprising a rotating portion of the spool, and a fixed enclosure portion that does not rotate, the rotating boundary portion and the fixed enclosure portion defining a balance piston cavity, and a water system providing water to the balance piston cavity the water in the balance piston cavity is a balance piston fluid, and the balance piston fluid absorbs heat from the balance piston, causing an expansion and a pressure increase in the balance piston fluid generating the second axial force.

The turbine engine of the preceding clause, the water system comprising a water supply supplying the water to the water system, water supply lines connecting the water supply to the balance piston, a water pump causing a flow of the water through the water supply lines, a flow control valve controlling a rate of the flow of the water to the balance piston, and a controller controlling operation of the water pump and the flow control valve to control the second axial force by controlling the rate of the flow of the water to the balance piston.

The turbine engine of any preceding clause, wherein the balance piston fluid is two-phase steam.

The turbine engine of any preceding clause, wherein the balance piston fluid is supercritical steam.

The turbine engine of any preceding clause, the balance piston further comprising at least one interface between the rotating boundary portion and the fixed enclosure portion, the at least one interface allowing for a defined leak rate of the balance piston fluid from the balance piston cavity, to allow for continuous flow of water through the balance piston cavity.

The turbine engine of any preceding clause, wherein the spool is a low pressure spool, the compressor is a low pressure compressor, the turbine is a low pressure turbine, the shaft is a low pressure shaft, the first axial force is a low pressure first axial force, the balance piston is a low pressure balance piston, the rotating boundary portion is a low pressure rotating boundary portion, the fixed enclosure portion is a low pressure fixed enclosure portion, the balance piston cavity is a low pressure balance piston cavity, the balance piston fluid is a low pressure balance piston fluid, the second axial force is a low pressure second axial force, the turbine engine further comprises a high pressure spool, the high pressure spool comprises a high pressure compressor disposed between the low pressure compressor and the combustor that further compresses the core air from the low pressure compressor before the core air flows into the combustor, a high pressure turbine disposed between the combustor and the low pressure turbine, caused to rotate by the combustion gases prior to the combustion gases flowing into the low pressure turbine, and a high pressure shaft connecting the high pressure compressor and the high pressure turbine such that the high pressure compressor and the high pressure turbine rotate together, the core air, the high pressure compressor, and the high pressure turbine generating a high pressure first axial force on the spool, a high pressure balance piston that applies a high pressure second axial force on the high pressure spool to balance at least a portion of the high pressure first axial force, the high pressure balance piston comprises a high pressure rotating boundary portion that comprises a rotating portion of the high pressure spool, and a high pressure fixed enclosure portion that does not rotate, the high pressure rotating boundary portion and the high pressure fixed enclosure portion defining a high pressure balance piston cavity, wherein the water system provides water to the high pressure balance piston cavity, the water in the high pressure balance piston cavity is a high pressure balance piston fluid, the high pressure balance piston fluid absorbs heat from the high pressure balance piston, causing an expansion and a pressure increase in the high pressure balance piston fluid, generating the high pressure second axial force.

The turbine engine of the preceding clause, the water system further comprising a water supply supplying the water to the water system, water supply lines connecting the water supply to the high pressure balance piston and the low pressure balance piston, a water pump causing a flow of the water through the water supply lines, a low pressure flow control valve controlling a rate of the flow of the water to the low pressure balance piston, a high pressure flow control valve controlling a rate of the flow of the water to the high pressure balance piston, and a controller controlling operation of the water pump, the low pressure flow control valve and the high pressure flow control valve in order to control the rate of the flow of the water to the low pressure balance piston and to the high pressure balance piston, to control the low pressure second axial force and the high pressure second axial force, respectively The turbine engine of any preceding clause, wherein the water system further comprises a liquid water supply and an evaporator that converts the liquid water supply into a steam supply that is introduced into the balance piston.

The turbine engine of the preceding clause, the water system further comprising a steam turbine, wherein the steam supply flows to the steam turbine, the steam turbine extracts a portion of thermal energy, kinetic energy, or thermal energy and kinetic energy from the steam supply.

The turbine engine of the preceding clause, wherein the steam supply further flows to the combustor.

The turbine engine of any preceding clause, wherein the steam supply further flows to a piston cavity.

The turbine engine of any preceding clause, the shaft defining a secondary cavity, and the rotating boundary portion further comprises at least one passage therethrough, wherein the balance piston fluid flows through the passage and into the secondary cavity.

The turbine engine of the preceding clause, wherein the passage is a first passage, the shaft further comprises at least one second passage therethrough, and the balance piston fluid flows from the secondary cavity through the second passage into the turbine.

The turbine engine of any preceding clause, wherein the secondary cavity comprises turbine rotor disks that transfer heat to the balance piston fluid in the secondary cavity, to cool the turbine rotor disks.

The turbine engine of any preceding clause, wherein the secondary cavity is a plurality of secondary cavities, the passage is a plurality of passages, and at least one of the plurality of passages connects to each of the plurality of secondary cavities allowing the balance piston fluid to flow through into each of the plurality of secondary cavities.

The turbine engine of the preceding clause, wherein the plurality of passages is a plurality of first passages, the shaft further comprises a plurality of second passages therethrough, at least one of the plurality of second passages connecting to each of the plurality of secondary cavities, and the balance piston fluid flows from the secondary cavities through the respective second passages into the turbine.

A method of supporting axial force on the turbine engine of any preceding clause, the method comprising providing water to the balance piston, the water becoming the balance piston fluid, transferring heat from the balance piston to the balance piston fluid to expand the balance piston fluid and to increase pressure of the balance piston fluid, and generating the second axial force.

The method of the preceding clause, wherein the water system further comprises a water supply supplying the water to the water system, water supply lines connecting the water supply to the balance piston, a water pump causing a flow of the water through the water supply lines, a flow control valve controlling a rate of the flow of the water to the balance piston, and a controller, and the method further comprises controlling the water pump and the flow control valve in order to control the rate of the flow of the water to the balance piston, to control the second axial force.

The method of any preceding clause, wherein the water is in a liquid phase until the water enters the balance piston cavity, becoming two-phase steam through heat transfer from the balance piston cavity.

The method of any preceding clause, wherein the water is in a liquid phase until the water enters the balance piston cavity becoming supercritical steam through heat transfer from the balance piston cavity.

The method of any preceding clause, the balance piston further comprising at least one interface between the rotating boundary portion and the fixed enclosure portion, and the method further comprising leaking the balance piston fluid from the balance piston cavity, through the at least one interface, at a defined rate.

The method of any preceding clause, wherein the spool is a low pressure spool, the compressor is a low pressure compressor, the turbine is a low pressure turbine, the shaft is a low pressure shaft, the balance piston is a low pressure balance piston, the rotating boundary portion is a low pressure rotating boundary portion, the fixed enclosure portion is a low pressure fixed enclosure portion, the balance piston fluid is a low pressure balance piston fluid, the second axial force is a low pressure second axial force, the turbine engine further comprises a high pressure spool, the high pressure spool comprises a high pressure compressor disposed between the low pressure compressor and the combustor that further compresses the core air from the low pressure compressor before the core air flows into the combustor, a high pressure turbine disposed between the combustor and the low pressure turbine, the high pressure turbine caused to rotate by the combustion gases prior to flowing into the low pressure turbine, and a high pressure shaft connecting the high pressure compressor and the high pressure turbine such that the high pressure compressor and the high pressure turbine rotate together, the core air, the high pressure compressor, and the high pressure turbine generating a high pressure first axial force on the spool, a high pressure balance piston that applies a high pressure second axial force on the high pressure spool to balance at least a portion of the high pressure first axial force, the high pressure balance piston comprises a high pressure rotating boundary portion comprises a rotating portion of the high pressure spool, and a high pressure fixed enclosure portion that does not rotate, the high pressure rotating boundary portion and the high pressure fixed enclosure portion defining a high pressure balance piston cavity, and the method further comprises providing water to the high pressure balance piston cavity, such that the water in the high pressure balance piston cavity, the water becomes a high pressure balance piston fluid, transferring heat from the high pressure balance piston to the high pressure balance piston fluid, expanding the high pressure balance piston fluid and increasing pressure of the high pressure balance piston fluid, and generating the high pressure second axial force.

The method of the preceding clause, wherein the water system further comprises a water supply supplying the water to the water system, water supply lines connecting the water supply to the low pressure balance piston and to the low pressure balance piston, a water pump causing a flow of the water through the water supply lines, a low pressure flow control valve controlling a rate of the flow of the water to the low pressure balance piston, a high pressure flow control valve controlling a rate of the flow of the water to the high pressure balance piston, and a controller, and the method further comprises controlling the water pump, the low pressure flow control valve and the high pressure flow control valve in order to control the rate of the flow of the water to the low pressure balance piston and to the high pressure balance piston, to control the low pressure second axial force and the high pressure second axial force, respectively.

The method of any preceding clause, wherein the water system further comprises an evaporator, and the water is a liquid water supply prior to entering the evaporator, and the method further comprises converting the liquid water supply into a steam supply in the evaporator and introducing the steam supply into the balance piston.

The method of the preceding clause, wherein the water system further comprises a steam turbine, and the method further comprises causing the steam supply to flow to the steam turbine, extracting a portion of thermal energy, kinetic energy, or thermal energy and kinetic energy from the steam supply.

The method of the preceding clause, further comprising causing the steam supply to flow to the combustor after flowing through the steam turbine.

The method of any preceding clause, further comprising causes the steam supply to flow to a piston cavity after flowing through the steam turbine.

The method of any preceding clause, the shaft further comprises a secondary cavity, and the rotating boundary portion further comprises at least one passage therethrough, the method further comprises flowing the balance piston fluid through the passage and into the secondary cavity and transferring heat from the secondary cavity to the balance piston fluid.

The method of the preceding clause, wherein the secondary cavity comprises turbine rotor disks, the method further comprises transferring heat from the turbine rotor disks to the balance piston fluid in the secondary cavity, to cool the turbine rotor disks.

The method of the preceding clause, wherein the passage is a first passage, and the shaft further comprises at least one second passage therethrough, and the method further comprises flowing the balance piston fluid from the secondary cavity through the passage into the turbine.

The method of any preceding clause, wherein the secondary cavity is a plurality of secondary cavities and the passage is a plurality of passages, at least one of the plurality of passages connecting to each of the secondary cavities, the method further comprises causing the balance piston fluid to flow to the plurality of secondary cavities and transferring heat from each of the plurality of secondary cavities to the balance piston fluid in the respective secondary cavity.

The method of the preceding clause, wherein the plurality of passages is a plurality of first passages, the shaft further comprises a plurality of second passages therethrough, at least one of the plurality of second passages connecting to each of the plurality of secondary cavities, and the method further comprises causing the balance piston fluid to flow from each of the plurality of secondary cavities through the corresponding at least one of the plurality of secondary passages into the turbine.

Although the foregoing description is directed to the preferred embodiments, it is noted that other variations and modifications will be apparent to those skilled in the art, and may be made without departing from the disclosure Moreover, features described in connection with one embodiment may be used in conjunction with other embodiments, even if not explicitly stated above.

The invention claimed is:
1. A turbine engine comprising:
a spool comprising:
 a compressor that compresses core air;
 a turbine; and
 a shaft connecting the compressor and the turbine such that the compressor and the turbine rotate together;
a fuel supply;
a combustor located downstream of the compressor, the combustor receiving the core air and the fuel supply, and combusts the core air and the fuel supply to generate combustion gases, the combustion gases flowing to the turbine, causing rotation of the turbine, the core air, the combustion gases, the compressor, and the turbine generating a first axial force on the spool;
a balance piston that applies a second axial force on the spool to balance at least a portion of the first axial force, the balance piston comprising:
 a rotating boundary portion comprising a rotating portion of the spool; and
 a fixed enclosure portion that does not rotate, the rotating boundary portion and the fixed enclosure portion defining a balance piston cavity; and
a water system providing water to the balance piston cavity, wherein the water in the balance piston cavity is a balance piston fluid, the balance piston fluid absorbing heat from the balance piston, causing an expansion and a pressure increase in the balance piston fluid generating the second axial force.

2. The turbine engine of claim 1, wherein the balance piston fluid is two-phase steam or supercritical steam.

3. The turbine engine of claim 1, wherein the spool is a low pressure spool, the compressor is a low pressure compressor, the turbine is a low pressure turbine, the shaft is a low pressure shaft, the first axial force is a low pressure first axial force, the balance piston is a low pressure balance piston, the rotating boundary portion is a low pressure rotating boundary portion, the fixed enclosure portion is a low pressure fixed enclosure portion, the balance piston cavity is a low pressure balance piston cavity, the balance piston fluid is a low pressure balance piston fluid, the second axial force is a low pressure second axial force, and the turbine engine further comprises:
a high pressure spool comprising:
 a high pressure compressor disposed between the low pressure compressor and the combustor that further compresses the core air from the low pressure compressor before the core air flows into the combustor;
 a high pressure turbine disposed between the combustor and the low pressure turbine, the high pressure turbine caused to rotate by the combustion gases prior to the combustion gases flowing into the low pressure turbine; and
 a high pressure shaft connecting the high pressure compressor and the high pressure turbine such that the high pressure compressor and the high pressure turbine rotate together, the core air the high pressure compressor and the high pressure turbine generating a high pressure first axial force on the spool;
a high pressure balance piston that applies a high pressure second axial force on the high pressure spool to balance at least a portion of the high pressure first axial force, the high pressure balance piston comprising:
 a high pressure rotating boundary portion comprising a rotating portion of the high pressure spool; and
 a high pressure fixed enclosure portion that does not rotate, the high pressure rotating boundary portion and the high pressure fixed enclosure portion defining a high pressure balance piston cavity,
wherein the water system provides water to the high pressure balance piston cavity, the water in the high pressure balance piston cavity is a high pressure balance piston fluid, the high pressure balance piston fluid absorbs heat from the high pressure balance piston, causing an expansion and a pressure increase in the high pressure balance piston fluid, generating the high pressure second axial force.

4. The turbine engine of claim 1, wherein the water system further comprises a liquid water supply and an evaporator that converts the liquid water supply into a steam supply that is introduced into the balance piston.

5. The turbine engine of claim 4, the water system comprising a steam turbine, wherein the steam supply flows to the steam turbine, the steam turbine extracts a portion of thermal energy, kinetic energy, or thermal energy and kinetic energy from the steam supply, and the steam supply further flows to the combustor or to a piston cavity.

6. The turbine engine of claim 1, the shaft defining a secondary cavity, and the rotating boundary portion further comprising at least one passage therethrough, wherein the balance piston fluid flows through the passage and into the secondary cavity.

7. The turbine engine of claim 6, wherein the secondary cavity comprises turbine rotor disks that transfer heat to the balance piston fluid in the secondary cavity, to cool the turbine rotor disks.

8. The turbine engine of claim 6, wherein the at least one passage comprises a first passage, the shaft further comprises at least one second passage therethrough, and the balance piston fluid flows from the secondary cavity through the at least one second passage into the turbine.

9. The turbine engine of claim 6, wherein the secondary cavity is a plurality of secondary cavities, the at least one passage comprises a plurality of passages, and the plurality of passages connect to each of the plurality of secondary cavities allowing the balance piston fluid to flow through into each of the plurality of secondary cavities.

10. The turbine engine of claim 9, wherein the plurality of passages is a plurality of first passages, the shaft comprises a plurality of second passages therethrough, the plurality of second passages connecting to each of the plurality of secondary cavities, and the balance piston fluid flows from the secondary cavities through the respective second passages into the turbine.

11. A method of supporting axial force on the turbine engine of claim 1, the method comprising:
providing water to the balance piston, the water becoming the balance piston fluid, transferring heat from the balance piston to the balance piston fluid to expand the balance piston fluid and to increase pressure of the balance piston fluid, and generating the second axial force.

12. The method of claim 11, wherein the water is in a liquid phase until the water enters the balance piston cavity, becoming two-phase steam or supercritical steam.

13. The method of claim 11, wherein the spool is a low pressure spool, the compressor is a low pressure compressor, the turbine is a low pressure turbine, the shaft is a low pressure shaft, the balance piston is a low pressure balance piston, the rotating boundary portion is a low pressure rotating boundary portion, the fixed enclosure portion is a low pressure fixed enclosure portion, the balance piston fluid is a low pressure balance piston fluid, the second axial force is a low pressure second axial force, and the turbine engine further comprises:
  a high pressure spool comprising:
    a high pressure compressor disposed between the low pressure compressor and the combustor that further compresses the core air from the low pressure compressor before the core air flows into the combustor;
    a high pressure turbine disposed between the combustor and the low pressure turbine, the high pressure turbine caused to rotate by the combustion gases prior to the combustion gases flowing into the low pressure turbine; and
    a high pressure shaft connecting the high pressure compressor and the high pressure turbine such that the high pressure compressor and the high pressure turbine rotate together, the core air, the high pressure compressor, and the high pressure turbine generating a high pressure first axial force on the spool;
  a high pressure balance piston that applies a high pressure second axial force on the high pressure spool to balance at least a portion of the high pressure first axial force, the high pressure balance piston comprising:
    a high pressure rotating boundary portion comprising a rotating portion of the high pressure spool; and
    a high pressure fixed enclosure portion that does not rotate, the high pressure rotating boundary portion and the high pressure fixed enclosure portion defining a high pressure balance piston cavity,
  wherein the method further comprises providing water to the high pressure balance piston cavity, such that the water in the high pressure balance piston cavity, becoming a high pressure balance piston fluid, transferring heat from the high pressure balance piston to the high pressure balance piston fluid, expanding the high pressure balance piston fluid and increasing pressure of the high pressure balance piston fluid, and generating the high pressure second axial force.

14. The method of claim 11, wherein the water system comprises an evaporator, and the water is a liquid water supply prior to entering the evaporator, and the method further comprises converting the liquid water supply into a steam supply in the evaporator and introducing the steam supply into the balance piston.

15. The method of claim 14, wherein the water system further comprises a steam turbine, the method further comprising causing the steam supply to flow to the steam turbine, extracting a portion of thermal energy, kinetic energy, or thermal energy and kinetic energy from the steam supply.

16. The method of claim 11, wherein the shaft comprises a secondary cavity, and the rotating boundary portion further comprises at least one passage therethrough, the method further comprising causing the balance piston fluid to flow through the at least one passage and into the secondary cavity and transferring heat from the secondary cavity to the balance piston fluid.

17. The method of claim 16, wherein the secondary cavity comprises turbine rotor disks, the method further comprising transferring heat from the turbine rotor disks to the balance piston fluid in the secondary cavity, to cool the turbine rotor disks.

18. The method of claim 16, wherein the at least one passage comprises a first passage, and the shaft further comprises at least one second passage therethrough, and the method further comprises causing the balance piston fluid to flow from the secondary cavity through the at least one second passage into the turbine.

19. The method of claim 16, wherein the secondary cavity is a plurality of secondary cavities and the at least one passage comprises a plurality of passages, the plurality of passages connecting to each of the secondary cavities, the method further comprising causing the balance piston fluid to flow to the plurality of secondary cavities and transferring heat from each of the plurality of secondary cavities to the balance piston fluid in the respective secondary cavity.

20. The method of claim 19, wherein the plurality of passages is a plurality of first passages, the shaft further comprises a plurality of second passages therethrough, the plurality of second passages connecting to each of the plurality of secondary cavities, and the method further comprises causing the balance piston fluid to flow from each of the plurality of secondary cavities through the corresponding secondary passages into the turbine.

\* \* \* \* \*